United States Patent
Heersink et al.

(10) Patent No.: US 12,122,513 B2
(45) Date of Patent: Oct. 22, 2024

(54) EVALUATION OF AIR VEHICLE FLIGHT CONTROLS

(71) Applicant: The Boeing Company, Chicago, IL (US)

(72) Inventors: Byron Nicholas Heersink, Chandler, AZ (US); Pape Maguette Sylla, Thousand Oaks, CA (US); Michael Alton Warren, Northridge, CA (US)

(73) Assignee: The Boeing Company, Chicago, IL (US)

( * ) Notice: Subject to any disclaimer, the term of this patent is extended or adjusted under 35 U.S.C. 154(b) by 196 days.

(21) Appl. No.: 17/676,115

(22) Filed: Feb. 18, 2022

(65) Prior Publication Data

US 2022/0283581 A1    Sep. 8, 2022

Related U.S. Application Data

(60) Provisional application No. 63/158,302, filed on Mar. 8, 2021.

(51) Int. Cl.
*B64C 39/02* (2023.01)
*G08G 5/00* (2006.01)
*B64U 30/20* (2023.01)
*B64U 101/00* (2023.01)

(52) U.S. Cl.
CPC ........... *B64C 39/024* (2013.01); *G08G 5/003* (2013.01); *B64U 30/20* (2023.01); *B64U 2101/00* (2023.01); *B64U 2201/20* (2023.01)

(58) Field of Classification Search
None
See application file for complete search history.

(56) References Cited

U.S. PATENT DOCUMENTS

| 2020/0072146 A1* | 3/2020 | Sata | G01L 23/225 |
| 2021/0365596 A1* | 11/2021 | Heersink | G06N 3/08 |

OTHER PUBLICATIONS

S. Prajna, A. Jadbabaie and G. J. Pappas, "A Framework for Worst-Case and Stochastic Safety Verification Using Barrier Certificates," in IEEE Transactions on Automatic Control, vol. 52, No. 8, pp. 1415-1428, Aug. 2007, doi: 10.1109/TAC.2007.902736 (Year: 2007).*

(Continued)

*Primary Examiner* — Peter D Nolan
*Assistant Examiner* — Michael F Whalen
(74) *Attorney, Agent, or Firm* — Jordan IP Law, LLC

(57) ABSTRACT

Systems and methods provide for the evaluation of flight controls for an aerial vehicle and define a vehicle dynamics model corresponding to an aerial vehicle. One or more barrier functions are constructed based on the defined vehicle dynamics model, and candidate invariant sets are identified for the defined vehicle dynamics model using the one or more barrier functions. A plurality of flight controls of the aerial vehicle are analyzed using the identified candidate invariant sets and within the analyzed candidate invariant sets, command tracking of the aerial vehicle is confirmed with control commands, using the analyzed plurality of flight controls. Control commands falling outside of the analyzed candidate invariant sets are identified.

20 Claims, 10 Drawing Sheets

(56) References Cited

OTHER PUBLICATIONS

L. Wang, E. A. Theodorou and M. Egerstedt, "Safe Learning of Quadrotor Dynamics Using Barrier Certificates," 2018 IEEE International Conference on Robotics and Automation (ICRA), Brisbane, QLD, Australia, 2018, pp. 2460-2465, doi: 10.1109/ICRA.2018.8460471.le. (Year: 2018).*

Saied Majd et al. "Fault Tolerant Control for Multiple Successive Failures in an Octorotor: Architecture and Experiments", 2015 IEEE/RSJ International Conference on Intelligent Robots and Systems (IROS), IEEE, dated Sep. 28-Oct. 2, 2015, Hamburg, Germany, pp. 40-45, XP032831573, DOI:10.1109/IROS.2015.7353112.

Nguyen Duc-Tien et al: "Fault-Tolerant Control of a Hexacopter UAV based on Self-Scheduled Control Allocation", 2018 International Conference on Unmanned Aircraft Systems (ICUAS), IEEE, dated Jun. 12-15, 2018, Dallas, Texas, USA, pp. 385-393, XP033396732, DOI: 10.1109/ICUAS.2018.8453440.

Sihao Sun et al: "Incremental Nonlinear Fault-Tolerant Control of a Quadrotor with Complete Loss of Two Opposing Rotors", arxiv.org, Cornell University Library, 201 Olin Library Cornell University Ithaca, NY 14853, dated Oct. 26, 2020, XP081799909, DOI: 10.1109/TRO.2020.301626.

European Search Report for application EP22159718 dated Jul. 19, 2022, Munich, Germany.

Final Office Action for Russian Application No. 2022105117 mailed Feb. 25, 2022.

Requisition by the Examiner, Canada Application No. 3,151,441, Dated Feb. 28, 2024, 5 Pages.

* cited by examiner

EVALUATION OF AIR VEHICLE FLIGHT CONTROLS

CROSS-REFERENCE TO RELATED APPLICATIONS

This application claims priority to U.S. Provisional Application Ser. No. 63/158,302 entitled "EVALUATION OF AIR VEHICLE FLIGHT CONTROLS" that was filed on Mar. 8, 2021, which is incorporated herein by reference in its entirety.

BACKGROUND

The use of multirotor air vehicles has been growing rapidly due to the high maneuverability and many applications for these vehicles, such as inspection and surveillance. For example, the quadrotor has been a popular platform with which to conduct unmanned aerial vehicle (UAV) research. While the quadrotor can tolerate partial rotor faults, the vehicle becomes uncontrollable if one of its rotors fails completely.

The octorotor is an alternative to the quadrotor that is more robust to rotor failures. However, again, multiple rotor failures can result in the octorotor becoming unstable. Different approaches have been used to address flight safety, object avoidance, path planning, etc. for these and other UAVs. In some examples, rules-based or expert knowledge systems are used for control. However, even if autonomous subsystems are used with these systems, it is in a piecemeal fashion. As a result, known solutions typically involve high cost; require manual oversight of even autonomous vehicles, robots, and process flow; demonstrate limited flexibility in new environments and circumstances not explicitly programmed into the original design; and do not adapt well to unplanned processes and procedures, such as the production of one-off parts or assemblies.

SUMMARY

The disclosed examples are described in detail below with reference to the accompanying drawing figures listed below. The following summary is provided to illustrate examples disclosed herein. It is not meant, however, to limit all examples to any particular configuration or sequence of operations.

Some examples provided herein include a computerized method of evaluation of flight controls for an aerial vehicle. The computerized method comprises defining a vehicle dynamics model corresponding to an aerial vehicle, constructing one or more barrier functions based on the defined vehicle dynamics model, and identifying candidate invariant sets for the defined vehicle dynamics model using the one or more barrier functions. The computerized method further comprises analyzing a plurality of flight controls of the aerial vehicle using the identified candidate invariant sets and confirming within the analyzed candidate invariant sets, command tracking of the aerial vehicle with control commands, using the analyzed plurality of flight controls. The computerized method also comprises identifying control commands falling outside of the analyzed candidate invariant sets.

Some examples provided herein include a system for evaluation of flight controls for an aerial vehicle. The system comprises at least one processor and at least one memory comprising computer program code. The at least one memory and the computer program code are configured to, with the at least one processor, cause the at least one processor to define a vehicle dynamics model corresponding to an aerial vehicle, construct one or more barrier functions based on the defined vehicle dynamics model, identify candidate invariant sets for the defined vehicle dynamics model using the one or more barrier functions, analyze a plurality of flight controls of the aerial vehicle using the identified candidate invariant sets, confirm within the analyzed candidate invariant sets, command tracking of the aerial vehicle with control commands, using the analyzed plurality of flight controls, and identify control commands falling outside of the analyzed candidate invariant sets.

Some examples provided herein include one or more computer storage media having computer-executable instructions for evaluation of flight controls for an aerial vehicle. The computer-executable instructions, upon execution by a processor, cause the processor to at least define a vehicle dynamics model corresponding to an aerial vehicle, construct one or more barrier functions based on the defined vehicle dynamics model, identify candidate invariant sets for the defined vehicle dynamics model using the one or more barrier functions, analyze a plurality of flight controls of the aerial vehicle using the identified candidate invariant sets, confirm within the analyzed candidate invariant sets, command tracking of the aerial vehicle with control commands, using the analyzed plurality of flight controls, and identify control commands falling outside of the analyzed candidate invariant sets.

The features, functions, and advantages that have been discussed are achieved independently in various examples or are to be combined in yet other examples, further details of which are seen with reference to the following description and drawings.

BRIEF DESCRIPTION OF THE DRAWINGS

The disclosed examples are described in detail below with reference to the accompanying drawing figures listed below.

Corresponding reference characters indicate corresponding parts throughout the drawings.

DETAILED DESCRIPTION

Figure 1:
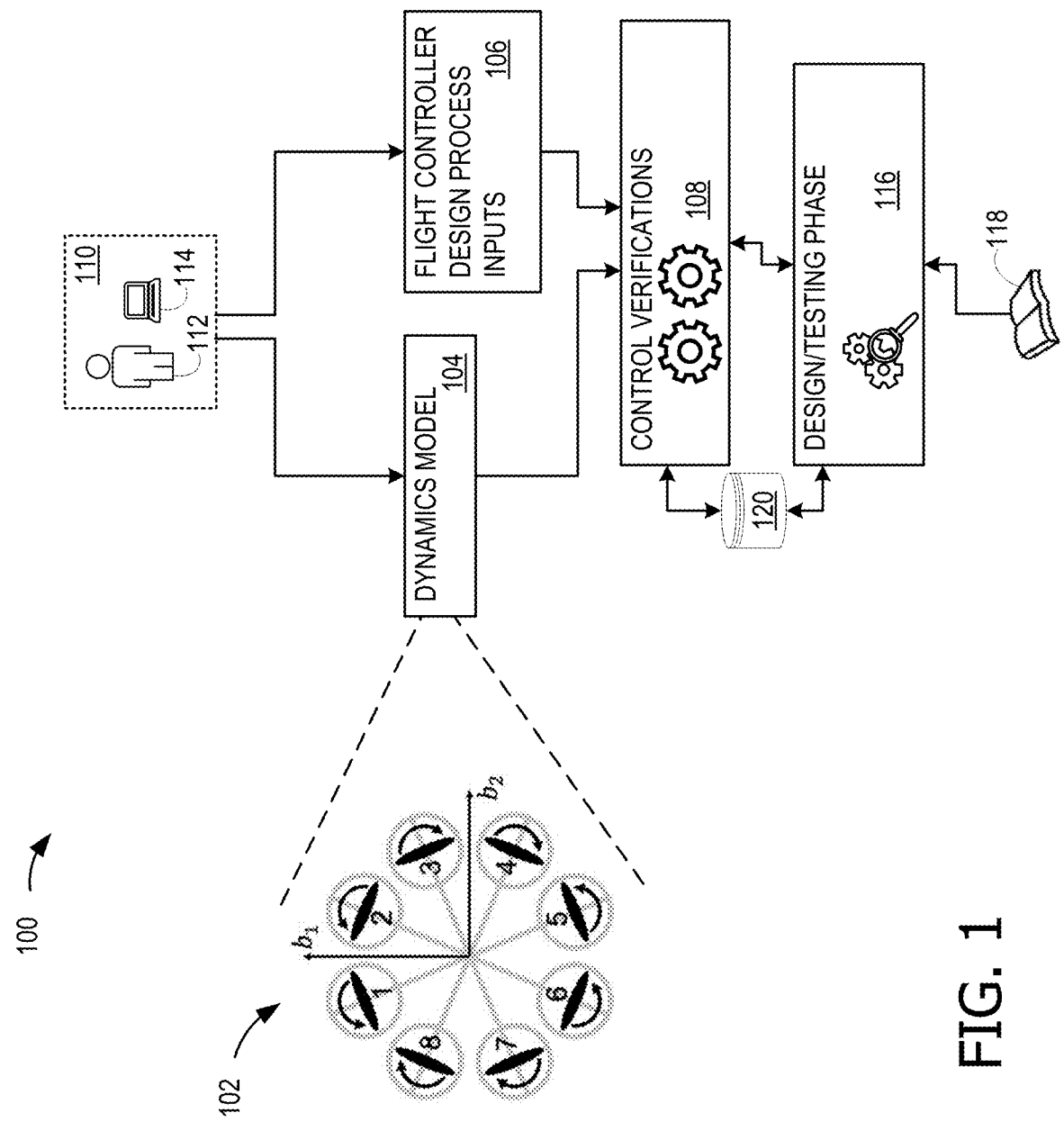
FIG. 1 illustrates an arrangement that advantageously employs barrier functions to evaluate vehicle controls in accordance with an example.

The various examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one implementation" or "one example" are not intended to be interpreted as excluding the existence of additional implementations that also incorporate the recited features. Moreover, unless explicitly stated to the contrary, examples "comprising" or "having" an element or a plurality of elements having a particular property could include additional elements not having that property.

Disclosed herein are implementations for evaluation of air vehicle flight controls, including performing a safety analysis thereof, such as of a multi-rotor aerial vehicle (e.g., octorotor), to verify the safety of the flight controller. Regions of the vehicle's state space that are considered safe, and which can be proven to be invariant with respect to the dynamics, are determined in various implementations using exponential barrier functions to construct candidate invariant regions near desired commanded states. Confirmation that these regions are invariant is determined automatically using a satisfiability modulo theories (SMT) solver, such as a dReal SMT solver. This ensures the accurate command tracking of the aerial vehicle, such as the octorotor, to within a certain margin of error. It should be noted that other automated reasoning tools (e.g., other SMT solvers) can be used.

Examples described herein will be made with respect to the octorotor. However, the present disclosure is capable of implementation with respect to other aerial vehicles or non-aerial vehicles. In one example, rotor failures in which rotor thrusts become stuck at fixed values are considered and accounted for via a pseudo-inverse control allocator. The safety of the control allocator is verified in the SMT solver by checking that the thrusts demanded by the allocator never exceed the capability of the rotors. The herein described implementations are described in connection with a specific octorotor example to illustrate verifying the desired command tracking properties of the controller under normal conditions and various combinations of rotor failures. It should be appreciated that the present disclosure is implementable in other applications, such as with aerial vehicles that have one rotor, two rotors, four rotors, six rotors, eight rotors, or other numbers of rotors.

Various examples use barrier functions to analyze the safety properties of conventionally defined controllers during a design phase of the aerial vehicle or prior to use of the aerial vehicle, such as during verification and/or validation in a design or testing phase. That is, the present disclosure describes systems and methods to verify the safety of controllers using SMT solving during pre-production or pre-flight phases or stages. For example, controllers for flight vehicles are designed, and the flight envelope and asymptotic stability of the controller are verified using a controller design that is decoupled from the safety analysis, such that the present disclosure can be employed even in cases where the underlying controller can no longer be modified or where for other reasons it is not feasible to incorporate barrier functions at the design stage.

Various aspects and implementations disclosed herein are, thus, directed to solutions for the formal verification of the flight envelope of a UAV, particularly one that can be used independent of the design of the controller. In one example, this can be checked automatically. Referring more particularly to the drawings, FIG. 1 illustrates an arrangement 100 that advantageously employs barrier functions, more specifically exponential barrier functions as described in more detail herein, and SMT solving to produce an invariant subset of a prescribed safe region near a desired commanded point in a control system's state space. The arrangement 100 is configured to analyze systems with a controller designed to track commands and wherein dynamics are approximated reasonably by the linearization around a desired operating state. As such, the arrangement 100 is well adapted, for example, to analyzing UAV safety in states where the vehicle is nearly upright or slightly tilting, or for use in the verification of gain scheduled controllers that are used for many kinds of aircraft.

The arrangement 100 is illustrated in connection with analyzing the flight controls of an octorotor 102, which is robust to rotor failures. With the fault tolerance in the herein described implementation, the arrangement 100 can account for complete rotor failure, in which one or more rotors stop working entirely and exert zero thrust, and more generally failures in which rotors become stuck at specific speeds. To mitigate these failures, a control allocator as described in more detail herein is used to attempt to maintain the ideal octorotor behavior. In one example, the main or primary property of the control allocator that is verified is that the rotors are always capable of exerting the rotor thrusts commanded by the allocator. It should be noted that is assumed that failures are perfectly known, and as such, issues of fault detection are not determined. It should also be noted that the arrangement 100 is capable of analyzing different controls of different vehicles, such as other UAVs.

The arrangement 100, in various examples, generates one or more barrier functions, such as control barrier functions based on a dynamics model 104 to perform analysis of flight controller design process inputs 106. That is, the dynamics model 104 is used in some examples to determine or generate the one or more barrier functions, and which also uses the flight controller design process inputs 106 to perform flight control analysis, such as for one or more control verifications 108.

Figure 10:
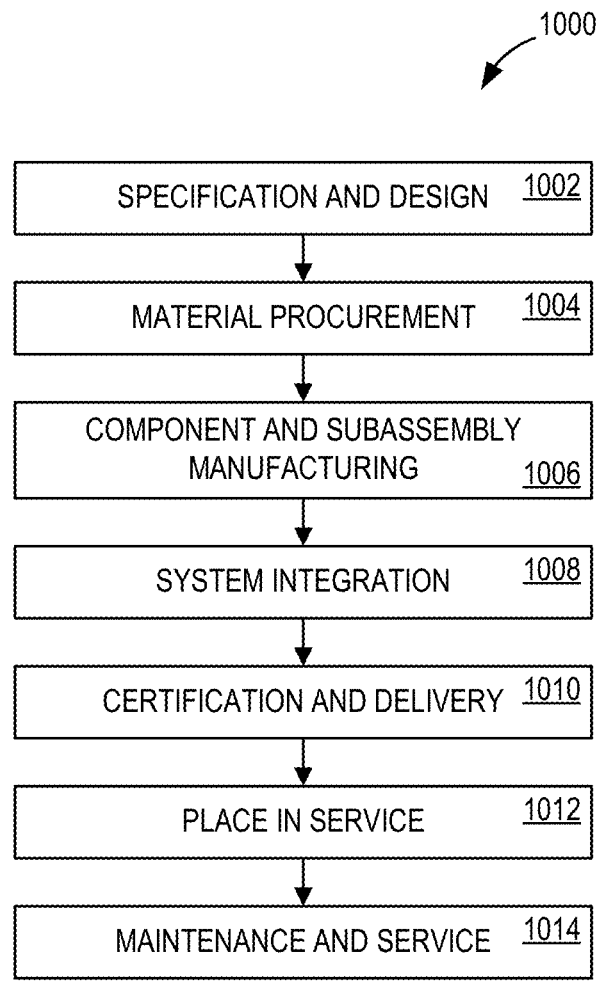
FIG. 10 is a block diagram of an apparatus production and service method that advantageously employs various aspects of the disclosure.

In one example, the one or more control verifications 108 are performed by issuing instructions or commands to an evaluation processor as described in more detail herein to perform analysis of control operations on the octorotor 102 to determine how the octorotor 102 responds to control commands. In one example, the arrangement 100 is employed during production, component and subassembly manufacturing 1006 during pre-production, in the apparatus manufacturing and service method 1000, as illustrated in FIG. 10.

In one example, the one or more control verifications 108 are performed, using SMT solving, based on instructions received from a human actor agent 110 that includes a human actor 112 accessing a user interface (UI) 114. The one or more control verifications 108 in some examples are performed using feedback information as described in more detail herein, and that is provided and/or acted upon by the actor agent 110. The one or more control verifications 108 in some examples control or perform safety analysis based on a non-linear octorotor model for various rotor failure scenarios. For example, as described in more detail herein, candidate invariant sets are produced that utilize SMT analysis of exponential barrier functions to perform the safety analysis. That is, command control verification for the octorotor 102 is performed in various examples.

It should be noted that the human actor 112 may both receive instructions from and provide inputs for use in the one or more control verifications 108 via the UI 114. In one example, the UI 114 is implemented using a computing device 900 illustrated FIG. 9.

The one or more control verifications 108 are used as part of design/testing phase or stage 116 for the octorotor 102 in the illustrated example. The design/testing phase or stage 116 provides pre-design, pre-deployment, and/or supplemental analysis for the control operations of the octorotor 102, using data 118, which in one example includes one or more candidate control barrier functions. Pre-design and/or pre-deployment operations may be used to modify the design process prior to deployment or operation of the octorotor 102. A data store 120 stores at least the instructions or data used when performing the one or more control verifications 108.

Figure 2:
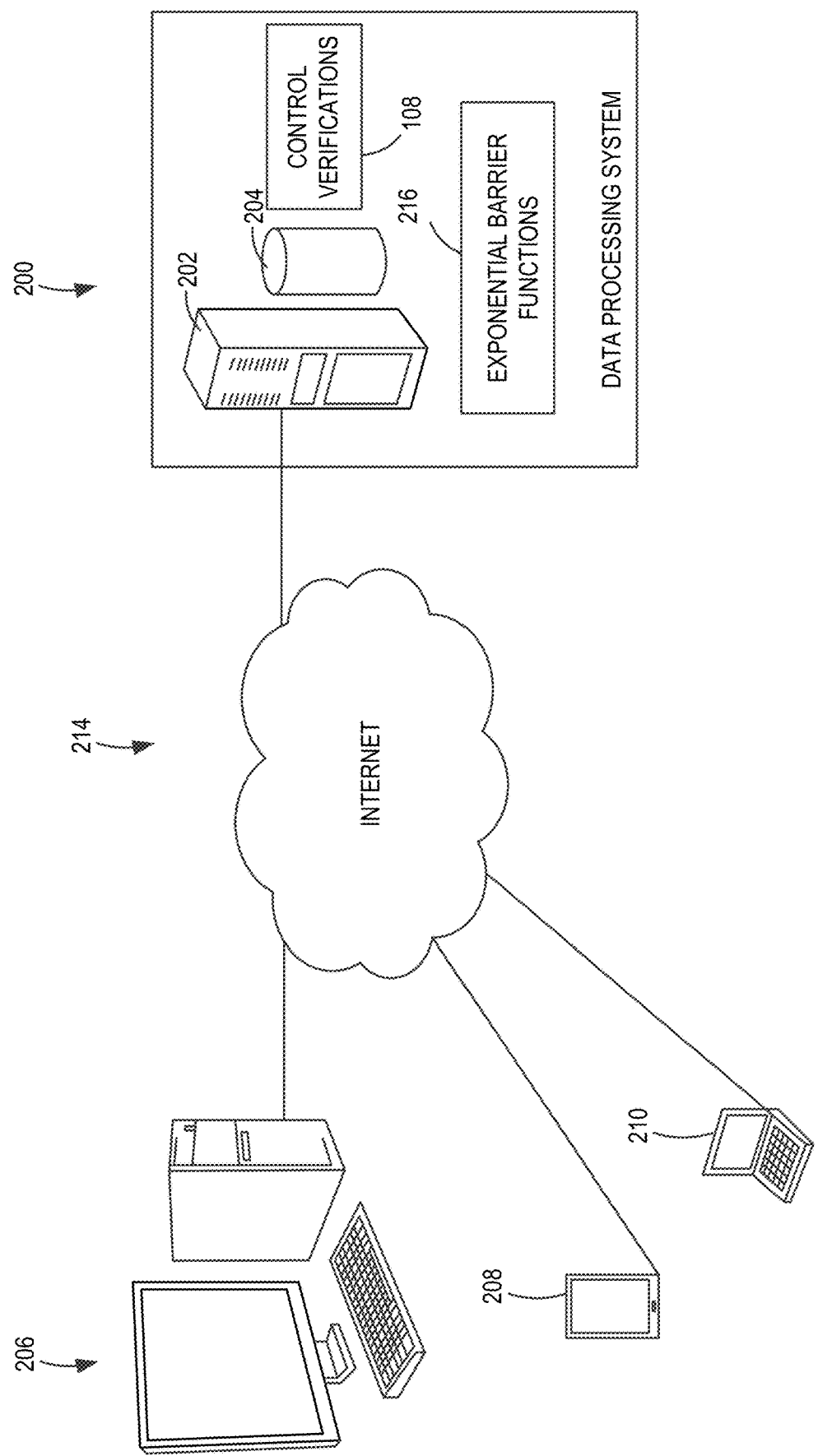
FIG. 2 is a block diagram illustrating a data processing system according to an example.

Referring now to FIG. 2, the one or more control verifications 108 is shown to be performed or implemented within a data processing system 200 (e.g., a safety analysis system) deployed as a cloud service as illustrated in FIG. 2. In this example, the data processing system 200 implements the evaluation, testing, and/or validation processes, particularly for vehicle flight controls, using control barrier functions. That is, the data processing system 200 operates using a verification and/or validation framework that in one example relies only on a dynamics model (e.g., the dynamics model 104), control barrier functions, such as exponential barrier functions 216, and SMT solving to perform safety verification of multirotor aerial vehicles, especially the octorotor 102, and closely related flight control systems. The data processing system 200 provides an automated way to verify the behavior of vehicles in relation to commands to be given, for example, by the pilot, and, specifically, whether the flight control system is capable of accurately tracking the target commands.

The data processing system 200 includes one or more computers 202 and storage 204 to store, for example, dynamics models and flight controller design process information. It should be appreciated that other data can be stored in the storage 204 and processed by the one or more computers 202 using the present disclosure.

The data processing system 200 is connected to one or more end user computing devices in some examples, such as a desktop computer 206, a smart phone 208, and a laptop computer 210. For example, the data processing system 200 is shown as connected to the end user computing devices via a computer network 214, illustrated as the Internet.

The data processing system 200 receives input data, such as one or more octorotor dynamics models and flight controller design process information from an end user computing device or server. The data is uploaded to the data processing system 200 for processing, such as for evaluating the performance of control commands to the octorotor 102 (shown in FIG. 1). It should be appreciated that some or all of the data processing system 200 or the functionality of the data processing system 200 can be implemented within the end user computing device.

The data processing system 200 in this example implements the one or more control verifications 108 for evaluation, testing, and/or validation processes, particularly for vehicle flight controls, using SMT analysis of control barrier functions. In some examples, the functionality of the data processing system 200 described herein is performed, at least in part, by one or more hardware logic components. For example, and without limitation, illustrative types of hardware logic components that are used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

With the present disclosure, in one implementation, at a design phase or stage (or a testing stage or phase), before the vehicle is deployed, potential safety issues with the flight control system are diagnosed and corrected prior to deployment. For example, the data processing system 200 is operable to identify regions of the vehicle's state space that are considered safe or desirable by the pilot. These are candidates for being forward invariant in the sense that the vehicle is guaranteed to stay within the regions. The data processing system 200 provides a means for automatically checking whether a given candidate region is invariant. Additionally, in some examples, the data processing system 200 evaluates the ability of the flight control system to account for rotor failures in which either one or more rotors stop working entirely or the rotor thrusts get stuck at certain fixed values. Thus, the data processing system 200 is configured to verify in an automated fashion whether the vehicle is capable of adapting to rotor failures via a pseudo-inverse control allocator as described in more detail herein. As such, the data processing system is able to quantify with certainty the command tracking capabilities of a multirotor aerial vehicle under normal conditions and with various rotor failures.

For example, the data processing system 200 uses the SMT analysis of exponential barrier functions 216 to determine forward invariant sets for aerial vehicles. More specifically, the data processing system 200 identifies candidate invariant sets using linear inequalities involving the vehicle state that result from constructing candidate exponential barrier functions 216 for the linearized dynamics of the control system. The candidate exponential barrier functions 216 are automatically analyzed using SMT solving in order to confirm or refute whether these functions are genuine barrier functions (i.e., correspond to invariant sets of the system). It should be noted that, as such, the controller design for the aerial vehicle is decoupled from the evaluation of the flight control system, instead of assuming that the controller is designed concurrently with the safety evaluation. That is, various implementations of the present disclosure can be employed in cases where the underlying controller of the vehicle can no longer be modified, or where it is not feasible to incorporate barrier functions at the design stage.

Figure 3:
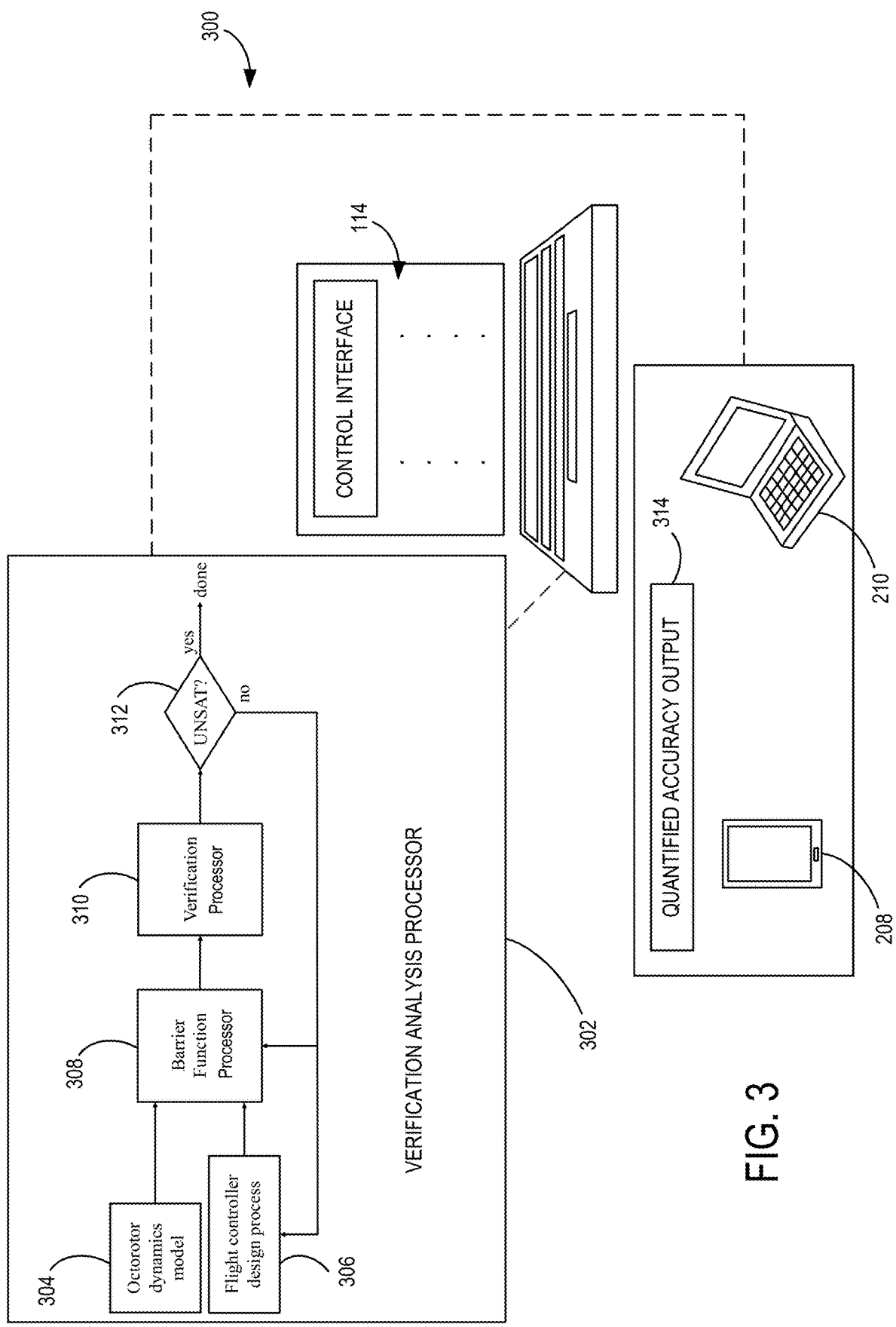
FIG. 3 is a block diagram of an evaluation system according to an example.

Various examples include an evaluation system 300 as illustrated in FIG. 3. The evaluation system 300 in one example uses barrier functions with different dynamics models 304 (illustrated as an octorotor dynamics model) to perform validation of a flight controller design process 306 to assess the safety of the performance of controllers for multirotor aerial vehicles. With the evaluation system 300, the accuracy with which the vehicle is able to track commands given by a pilot can be precisely quantified with certainty, unlike Monte Carlo simulation, which is generally a common method of aircraft safety verification, in that the evaluation system 300 is able to assess the behavior of aerial vehicles comprehensively and uniformly over ranges of valid vehicle states, as opposed to a set of discrete points assessed by Monte Carlo. And as discussed herein, the evaluation system 300 is not closely tied to the design of the controller being analyzed, and can be applied to an already defined controller without requiring modifications.

More particularly, the evaluation system 300 includes a verification analysis processor 302 that is configured in some examples as a processing engine that performs analysis of the performance of one or more controllers, such as flight controls of a multirotor air vehicle (e.g., the octorotor 102), to evaluate or assess the safety of the performance of the one or more controllers (e.g., provided a quantified accuracy output 314 with which the multirotor air vehicle is able to track control commands). It should be noted the evaluation system 300 can be applied to different types of evaluations for different types of vehicles.

The evaluation system 300 has access to input data, which in the illustrated example includes the different dynamics models 304 and design data relating to the flight controller design process 306. For example, the evaluation system 300 has access to different dynamics models 304 relating to the octorotor 102 used to generate or define one or more control barrier functions, which as described in more detail herein, are one or more candidate control barrier functions used to verify, via SMT analysis, the performance of the one or more controls of the octorotor 102. In some examples, the different dynamics models 304 are models for octorotor dynamics during one or more failure scenarios of interest.

Figure 4:
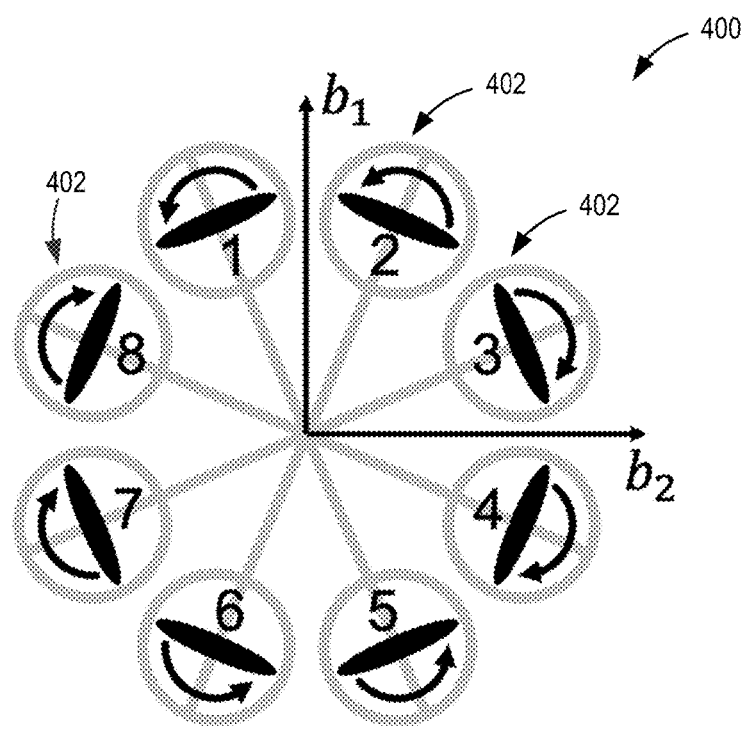
FIG. 4 illustrates an octorotor according to an example.

In general, various examples use an octorotor dynamics model to model the rigid body dynamics and some characteristics of the rotors 402 of an octorotor 400 as illustrated in FIG. 4, and which may be embodied as the octorotor 102 (shown in FIG. 1). The octorotor 400 includes eight identical rotors 402 arranged in the shape of a regular octagon as illustrated in FIG. 4. Each rotor 402 exerts an upward thrust normal to the plane of the octorotor, and a torque about the center of mass of the octorotor 400 as described below.

In one example, to express the dynamics of the octorotor 400, two reference frames are defined. First, a world reference frame is defined, which is assumed to be inertial, and is given by the standard unit basis vectors $\{e_1=[1,0,0]^T, e_2=[0,1,0]^T, e_3=[0,0,1]^T\}$. In this example, it is assumed that $e_1$ points north, $e_2$ points east, and $e_3$ points down. Next, it is assumed that the body of the octorotor 400 has a reference frame (body reference frame) given by the orthonormal (vertical) vectors $b_1$, $b_2$, $b_3$, where $b_1$ is considered the forward direction with respect to the octorotor 400, $b_2$ is the right direction, and $b_3$ is the down direction (in FIG. 4, $b_3$ points into the page.) The 3×3 matrix $[b_1, b_2, b_3]$ is denoted by R, which is the rotation matrix from the body frame to the world frame.

A state space of the system will now be described. In the state space, the inertial position of the center of mass of the octorotor 400 is denoted by $r=[x,y,z]^T$, and the inertial velocity by $v=[v_x,v_y,v_z]^T$. Another component of the state of the octorotor 400 is an orientation, which is given by R. Alternatively, the orientation can be expressed in terms of Euler angles $E=[\phi,\theta,\psi]^T$, wherein $\phi,\theta,\psi$ are the roll, pitch, and yaw angles, respectively, corresponding to the Z-Y-X sequence for Euler angles, which results in the following relationship between R and $[\phi,\theta,\psi]$:

$$R = \begin{bmatrix} c_\psi & -s_\psi & 0 \\ s_\psi & c_\psi & 0 \\ 0 & 0 & 1 \end{bmatrix} \begin{bmatrix} c_\theta & 0 & s_\theta \\ 0 & 1 & 0 \\ -s_\theta & 0 & c_\theta \end{bmatrix} \begin{bmatrix} 1 & 0 & 0 \\ 0 & c_\phi & -s_\phi \\ 0 & s_\phi & c_\phi \end{bmatrix}$$

$$= \begin{bmatrix} c_\theta c_\psi & s_\phi s_\theta c_\psi - c_\phi s_\psi & s_\phi s_\theta c_\psi + s_\phi s_\psi \\ c_\theta s_\psi & s_\phi s_\theta s_\psi + c_\phi s_\psi & c_\phi s_\theta s_\psi - s_\phi c_\psi \\ -s_\theta & s_\phi c_\theta & c_\phi c_\theta \end{bmatrix}.$$

In this example, $s_* = \sin(*)$, $c_* = \cos(*)$, and $t_* = \tan(*)$. And, the final component of the state space is the angular velocity vector $\Omega = [\Omega_1, \Omega_2, \Omega_3]^T$ of the octorotor 400 with respect to the body reference frame.

The control space of the octorotor 400 will now be described. The control space consists of the eight rotors 402, each of which exerts a force and torque on the octorotor 400. For simplicity, it is assumed that the thrust of each rotor 402 can be directly set, and as such, the motor dynamics are not modeled. Also, each rotor 402 is assumed to be able to rotate only in one direction as shown in FIG. 4, and that the thrust exerted is in the upward direction $-b_3$ with respect to the octorotor. Let $f_j$, $j=1, \ldots, 8$ denote the forces exerted by the rotors 402. It is then assumed that each $f_j$ is restricted to an interval $[f_{min}, f_{max}]$, where $f_{min}$ and $f_{max}$ are the least and greatest possible forces that each rotor 402 can exert on the octorotor 400, respectively. Since it is assumed that the rotors 402 can only rotate in one direction, $f_{min} \geq 0$.

Further, d denotes the distance from the center of mass of the octorotor 400 to the center of each rotor 402, and it is noted that the thrust of the jth rotor 402 induces a torque of magnitude $d \cdot f_j$ about an axis in the octorotor plane perpendicular to the arm containing the rotor 402. The jth rotor 402 also induces a torque about the $b_3$ axis of magnitude $c \cdot f_j$, where c is the ratio of induced torque to thrust. In particular, the rotors 402 that rotate counterclockwise induce a torque in the direction of $b_3$, and the rotors 402 that rotate clockwise induce a torque in the direction of $-b_3$.

In this example, F denotes the total thrust exerted by the rotors, and $\tau_1$, $\tau_2$, $\tau_3$ denote the net torque exerted by the rotors 402 about the body axes $b_1$, $b_2$, $b_3$, respectively. Then letting $\gamma = \pi/8$, the relationship between $u = [F, \tau_1, \tau_2, \tau_3]^T$ and $f_{all} = [f_1, \ldots, f_8]^T$ is given by $u = \Lambda f_{all}$, where $\Lambda$ is the matrix:

$$\begin{bmatrix} 1 & 1 & 1 & 1 & 1 & 1 & 1 & 1 \\ ds_\gamma & -ds_\gamma & -dc_\gamma & -dc_\gamma & -ds_\gamma & ds_\gamma & dc_\gamma & dc_\gamma \\ dc_\gamma & dc_\gamma & ds_\gamma & -ds_\gamma & -dc_\gamma & -dc_\gamma & -ds_\gamma & ds_\gamma \\ c & c & -c & -c & c & c & -c & -c \end{bmatrix}.$$

Next, let $m \in \mathbb{R}$ denote the mass of the octorotor 400, $g = 9.81$ m/s² be the gravitational acceleration, and $$J = \begin{bmatrix} J_1 & 0 & 0 \\ 0 & J_2 & 0 \\ 0 & 0 & J_3 \end{bmatrix}$$

be the inertia matrix of the octorotor 400 with respect to the body frame of the octorotor 400. Then let $\Delta_r = [\Delta_x, \Delta_y, \Delta_z]^T$ and $\Delta_R = [\Delta_{R,1}, \Delta_{R,2}, \Delta_{R,3}]^T$ denote unstructured force and torque for which disturbances due to dynamics that are unaccounted. In particular, in this example, these disturbances are viewed as encompassing aerodynamic effects such as air drag and blade flapping, which, for simplicity, are not modeled in detail. It is assumed that the disturbances are unknown, untracked, and measurable functions of time, and satisfy the inequalities $|\Delta_x|, |\Delta_y|, |\Delta_z| \leq \Delta_{r,max}$, and $|\Delta_{R,1}|, |\Delta_{R,2}| \leq \Delta_{R,12,max}, |\Delta_{R,3}| \leq \Delta_{R,3,max}$, where $\Delta_{r,max}, \Delta_{R,12,max}$, and $\Delta_{R,3,max}$ are fixed bounds. Then, the differential equations describing the motion of the octorotor 400 are:

$$\dot{r} = v$$

$$m\dot{v} = \begin{bmatrix} 0 \\ 0 \\ mg \end{bmatrix} - F \begin{bmatrix} c_\phi s_\theta c_\psi + s_\phi s_\psi \\ c_\phi s_\theta s_\psi - s_\phi c_\psi \\ c_\phi c_\theta \end{bmatrix} + \Delta_r$$

$$\begin{bmatrix} \dot{\phi} \\ \dot{\theta} \\ \dot{\psi} \end{bmatrix} = \begin{bmatrix} 1 & s_\phi t_\theta & c_\phi t_\theta \\ 0 & c_\phi & -s_\phi \\ 0 & \frac{s_\phi}{c_\theta} & \frac{c_\psi}{c_\theta} \end{bmatrix} \begin{bmatrix} \Omega_1 \\ \Omega_2 \\ \Omega_3 \end{bmatrix}$$

$$J\dot{\Omega} = \tau - \Omega \times J\Omega + \Delta_R.$$

In this example, the focus is on the dynamics of the components of the state vector $s=[v_z,\phi,\theta,\psi,\Omega_1,\Omega_2,\Omega_3]^T$, which is considered to be the "inner loop" components of the octorotor system. It should be noted that the derivative of these components do not depend on $[x, y, z, v_x, v_y]$, and so the components of s can be viewed as forming the state space of a well-defined control system.

Figure 5:
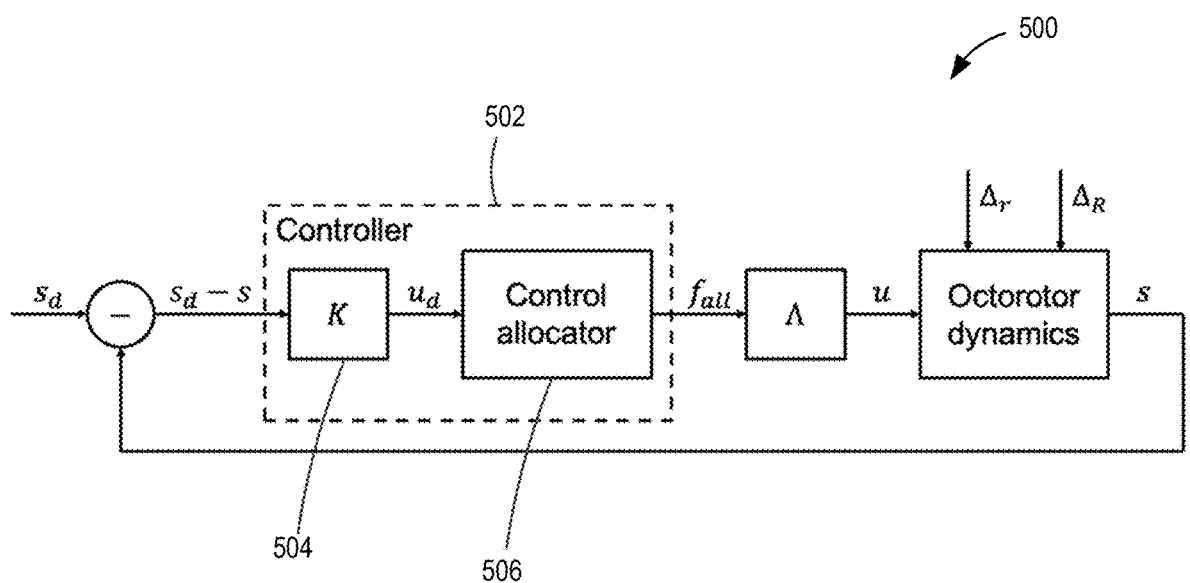
FIG. 5 is a block diagram of a control system according to an example.

As described herein, various examples are implemented to control the dynamics of the vertical velocity and orientation of the octorotor 400. In one example, a control system 500 includes a controller 502, as illustrated in FIG. 5, and is configured to have the components $v_z,\phi,\theta,\psi$ of the octorotor state track the command $(v_{z,d},\phi_d,\theta_d,\psi_d)$. In other words, in this example, it is desired that s track $s_d=[v_{z,d},\phi_d,\theta_d,\psi_d,0,0,0]^T$.

In the illustrated example, the controller 502 includes an input block, illustrated as a block K component 504, which takes as input, the difference $s_d$–s between the current state and the commanded state, and returns the commanded vector $u_d=[F_d,\tau_{1,d},\tau_{2,d},\tau_{3,d}]^T$ of net force and torques. The block K component 504 disregards whether the octorotor 400 is actually capable of executing $u_d$, that is, whether there exists a valid $f_{all}$ that yields the desired command. So, $u_d$ is not necessarily the actual control input $u=[F,\tau_1,\tau_2,\tau_3]^T$. To determine u, the controller 502 includes a control allocator 506, which takes $u_d$ as an input and returns a value for $f_{all}$ such that $f_{min} \leq f_j \leq f_{max}$ for all j and the resulting control input $u=\Lambda f_{all}$ is intended to equal, or be close to, $u_d$. It should be noted that additionally, the control allocator 506 is used to implement rotor failures. Specifically, it is assumed that rotor failures are always known and the control allocator 506 is defined so that the thrusts $f_j$ corresponding to the failed rotors 402 match the values at which the rotors 402 are stuck.

While under some circumstances the commanded value $u_d$ is not equal to u, for verifying safety, this condition should never happen. In particular, in this example, it is desired to find an invariant set for which all the commanded values $u_d$ can be executed by the octorotor 400. This allows the verification procedure to be split into two separate steps. The first step is to verify that a chosen candidate invariant set is rendered invariant by the controller 502 under the assumption that u is always equal to $u_d$. The second step is to verify that the equality $u=u_d$ is satisfied for the control allocator 506 for all states in the candidate invariant set. This step is performed for each rotor failure combination analyzed.

With respect to the block K component 504, in one example, this controller component has a proportional derivative (PD) structure, and is defined by the following:

$$F_d = \frac{mg}{c_\phi c_\theta} + K_{dz}(v_z - v_{z,d})$$

$$\tau_{1,d} = -K_{p\phi}(\phi - \phi_d) - K_{d\phi}\Omega_1$$

$$\tau_{2,d} = -K_{p\theta}(\theta - \theta_d) - K_{d\theta}\Omega_2$$

$$\tau_{3,d} = -K_{p\psi}(\psi - \psi_d) - K_{d\psi}\Omega_3.$$

It should be noted that $$\frac{mg}{c_\phi c_\theta}$$

is the total rotor thrust needed to keep the vertical acceleration of the octorotor 400 at 0. The various coefficients $K_*$ are taken from a linear quadratic regulator that is computed for the linearized octorotor dynamics at s=0, and under the assumption that $v_{z,d},\phi_d,\theta_d,\psi_d, \Delta_{r,max}, \Delta_{R,12,max}$, and $\Delta_{R,3,max}$ are all equal to 0.

In one example, to determine the individual rotor thrusts exerted by the octorotor 400 in response to the commanded control input $u_d$, a pseudo-inverse control allocation method is used. At this stage, the process accounts for the possibility that some of the rotors 402 have failed. So, in this example, let $W \subseteq \{1, \ldots, 8\}$ be the (possibly empty) set of indices corresponding to rotors that have failed, and for $j \in W$, let $\bar{f}_j \in [f_{min}, f_{max}]$ be the thrust at which rotor j is stuck. Also let $\bar{f}_j = 0$ for $j \notin W$ and $\bar{f}_{all}=[\bar{f}_1, \ldots, \bar{f}_8]^T$. Next, $\Lambda w$ is defined to be the matrix with the same entries as $\Lambda$, except that column j of $\Lambda w$ is zeroed out for all $j \in W$. Then let $\Lambda_w^\dagger$ be the pseudo-inverse of $\Lambda w$. With this, $\tilde{f}_{all}=[\tilde{f}_1, \ldots, \tilde{f}_8]^T$ is defined by:

$$\tilde{f}_{all}=\bar{f}_{all}+\Lambda_w^\dagger(u_d-\Lambda\bar{f}_{all}).$$

The vector $\tilde{f}_{all}$ consists of potential rotor values, with $\tilde{f}_j = \bar{f}_j$ for all $j \in W$ as required. However, it is possible that $\tilde{f}_j$ falls outside $[f_{min},f_{max}]$ for some $j \notin W$. Thus, $f_j$ for $j=1, \ldots, 8$ is defined by:

$$f_j = \begin{cases} \bar{f}_j & \text{if } j \in W \\ \text{mid}\{f_{min}, \tilde{f}_j, f_{max}\} & \text{if } j \notin W \end{cases}.$$

where $\text{mid}\{f_{min},\tilde{f}_j,f_{max}\}$ denotes the middle value of the set $\{f_{min},\tilde{f}_j,f_{max}\}$. Thus, $f_j \in [f_{min},f_{max}]$ for all $j \in W$, and so $f_{all}$ is defined as $f_{all}=[f_1, \ldots, f_8]^T$. Accordingly, the control allocator 506 is thereby defined.

It should be noted that there are conditions for which $u=u_d$. For example, the matrix $\Lambda w$ is of rank 4 if $|W|<4$, or $|W|=4$ and W is not equal to $\{1, 2, 3, 8\}, \{1, 2, 4, 7\}, \{1, 2, 5, 6\}$, or any index set that can be obtained from one of these sets by increasing each element by a common even number and taking the remainder upon division by eight when necessary. This is equivalent to rotating the rotor failure patterns corresponding to the three sets about the octorotor center by multiples of ninety degrees. When $\Lambda w$ is of rank 4, $\Lambda w \Lambda_w^{\dagger=I}{}_{4 \times 4}$ and $\Lambda \tilde{f}_{all}=u_d$. So, to determine whether $u=u_d$, a check only needs to be performed with respect to whether $\tilde{f}_j \in [f_{min},f_{max}]$ for all $j \notin W$, and this is the condition used, since in this example the condition of only up to two rotor failures is being considered.

Referring again to FIG. 3, a barrier function processor 308 of the verification analysis processor 302 generates or defines one or more barrier control functions based on the octorotor dynamics model 304 as described in more detail above, and uses the one or more barrier control functions to process the flight controller design process 306 as described in more detail herein. In one example, the safety conditions to be proved rely on the notion of invariant sets. An invariant set for a dynamical system is a region I of the state space of the system, such that if the state begins in I, then the state remains in I at all future times. The barrier function processor 308 is configured to ensure that for all commands $s_d$ that are to be provided to the octorotor 400, there exists an invariant set of octorotor states s which are close to $s_d$ (e.g., within a margin of error). Obtaining and verifying such invariant sets allows for determining with certainty how close the controller 502 is able to keep the octorotor state to the given commands even with the disturbances given in the dynamics model.

Thus, to identify the invariant sets, the verification analysis processor 302 utilizes barrier functions. In one example, the type of barrier function used is a form of an exponential barrier function. Then a set of linear inequalities on the state space is determined, which forms a candidate invariant region that can be verified by a verification processor 310 of the verification analysis processor 302.

With respect to defining the function used by the barrier function processor 308, in one example, $\dot{x}=f(x)$ defines a dynamical system on a set $X \subseteq \mathbb{R}^n$, and let $h_0: X \to \mathbb{R}$ be a differentiable function. In one example, the logic underlying the exponential barrier functions is that, for a trajectory $x(t)$ of the dynamical system, $h(x(t)) \geq 0$ for all $t \geq 0$ whenever $h(x(0)) \geq 0$ and $$\frac{d}{dt}(h(x(t))) + p_1 h(x(t)) = (\nabla h)(x(t)) \cdot f(x(t)) + p_1 h(x(t)) \geq 0$$

for all $t \geq 0$, where $p_1 > 0$ is a constant. Thus, to identify an invariant subset of $\{x \in X : h(x) \geq 0\}$, the extra inequality $h_1(x) := (\nabla h)(x) \cdot f(x) + p_1 h(x) \geq 0$ can be enforced, and forms the set $\{x \in X : h_0(x), h_1(x) \geq 0\}$. If it can then be proven that whenever the initial condition is chosen from this set, the inequality $h_1(x) \geq 0$ holds indefinitely, then $h_0(x) \geq 0$ is automatically maintained. A sequence of functions $h_j$ defined by $h_j(x) = (\nabla h_{j-1})(x) \cdot f(x) + p_j h_{j-1}(x)$ is then inductively formed and the sets $\{x \in X : h_j(x) \leq 0, j=0, \ldots, n\}$ examined to see if any of the sets are invariant, and in particular, checking if the inequality $h_n(x) \geq 0$ holds indefinitely when $h_0(x), \ldots, h_n(x) \geq 0$ holds at the initial condition.

In one example, the barrier function processor 308 operates within a barrier function framework used to construct invariant sets for the octorotor 400. The barrier function framework in one example assumes that the controller 502 is configured to track a fixed commanded state, and the dynamics are governed by a differential equation of the form $\dot{x}=f(x, x_d, d)$, where $x \in \mathbb{R}^n$ is the state, $x_d \in \mathbb{R}^d$ is the commanded state, $d \in \mathbb{R}^m$ denotes any potential disturbances (all three being vertical vectors), and f is Lipschitz on any candidate invariant set of interest. Next, it is assumed that the dynamics can be approximated sufficiently well by a linearization of the form $\dot{x}=A(x-x_d)$, $A \in \mathbb{R}^{n \times n}$. In the case of the octorotor 400, A results from the linearization of the dynamics where $s=0$. Next, it is assumed that the conditions desired to be enforced are of the form $P_i(x-x_d)+D_i \geq 0$, where $P_i$ is a horizontal vector of length n, and $D_i$ is a positive scalar. These inequalities form a starting set of states x nearby $x_d$ in which to find an invariant set. Then, the ability of the controller 502 to keep the state x near $x_d$ is analyzed.

In particular, a sequence of barrier functions is formed to enforce $P_i(x-x_d)+D_i \geq 0$. First, the system sets $p_{i,j}, \delta_{i,j} \geq 0$ to be constants for $j=1, \ldots, n_i$ such that $\Sigma_{j=1}^{n_i} \delta_{i,j} < D_i$. Then, the sequence of functions is defined as:

$$\tilde{h}_{i,0}(x) = P_i(x - x_d) + D_i$$

$$\tilde{h}_{i,1}(x) = P_i(I + p_{i,1}A)(x - x_d) + D_i - \delta_{i,1}$$

$$\tilde{h}_{i,2}(x) = P_i(I + p_{i,1}A)(I + p_{i,2}A)(x - x_d) + D_i - \delta_{i,1} - \delta_{i,2}$$

$$\vdots$$

$$\tilde{h}_{i,n_i}(x) = P_i(I + p_{i,1}A) \ldots (I + p_{i,n_i}A)(x - x_d) + D_i - \delta_{i,1} - \ldots - \delta_{i,n_i}.$$

where I is the n×n identity matrix. It should be noted that:

$$\tilde{h}_{i,j}(x) \leq \tilde{h}_{i,j-1}(x) + p_{i,j}\frac{d}{dt}(\tilde{h}_{i,j-1}(x))$$

for $j=1, \ldots, n_i$, and so if the inequality $h_{i,j} \geq 0$ holds, then $h_{i,j-1}$ holds automatically. Next, $\mu 0$ is set to be a parameter and the barrier function sequence is formed as:

$$h_{i,0,\mu}(x) = \frac{P_i(x - x_d)}{D_i} + \mu$$

$$h_{i,1,\mu}(x) = \frac{P_i(I + p_{i,1}A)(x - x_d)}{D_i - \delta_{i,1}} + \mu$$

$$h_{i,2,\mu}(x) = \frac{P_i(I + p_{i,1}A)(I + p_{i,2}A)(x - x_d)}{D_i - \delta_{i,1} - \delta_{i,2}} + \mu$$

$$\vdots$$

$$h_{i,n_i,\mu}(x) = \frac{P_i(I + p_{i,1}A) \cdots (I + p_{i,n_i}A)(x - x_d)}{D_i - \delta_{i,1} - \cdots - \delta_{i,n_i}} + \mu.$$

It should be noted that $h_{i,j,1}$ is a positive scalar multiple of $\tilde{h}_{i,j}$ and the number $n_i$ is the depth of the above sequence. Then $I(\mu)=\{x : h_{i,j,\mu}(x) \geq 0, \forall_i, \forall_j\}$ forms a parameterized family of candidate invariant sets, and $I(1)$ in particular is the candidate set that enforces the conditions $P_i(x-x_d)+D_i \geq 0$. The parameter $\mu$ allows for establishing a region of attraction for $I(1)$ by showing that when the initial system state is in $I(\mu_{max})$ for some $\mu_{max}>1$, the state will enter $I(\mu)$ for smaller and smaller $\mu$ over time until it reaches $I(1)$.

In order the confirm whether $I(\mu)$ is invariant for $\mu \in [1, \mu_{max}]$, it is sufficient to check that for all $x \in I(\mu_{max})$ and all i and j, $d/dt(h_{i,j,\mu}(x))>0$ whenever $h_{i,j,\mu}(x)=0$. This implication is referred to herein as the invariance condition for $h_{i,j,\mu}$. Under this condition, the least value of $\mu$ satisfying $h_{i,j,\mu}(x) \geq 0$ decreases with respect to time while $\mu \geq 1$.

It should be noted that with the linearized dynamics, it is only necessary to check the invariance condition for $h_{i,ni,\mu}$ for all i, since in this case, the condition that $h_{i,n_i,\mu}(x) \geq$holds implies that $h_{i,j,\mu}(x) \geq 0$ holds for all $j \leq n_i$. This continues to be true if $\delta_{i,j}=0$ for all i and j. However, since the invariance for the original nonlinear dynamics is to be verified by the verification processor 310, the invariance conditions for all functions are checked. This is because, under the nonlinear dynamics, the condition that $h_{i,j,\mu}(x) \geq 0$ holds may not automatically imply that $h_{i,j-1,\mu}(x) \geq 0$ for $\delta_{i,j}=0$, though this can be mitigated by increasing $\delta_{i,j}$.

It should be noted that in the case where $I(\mu)$ is proven to be invariant for $\mu \in [1, \mu_{max}]$, a check for an expanded region of attraction for $I(1)$ can be performed by verifying the invariance conditions for $\mu \in [\mu_{max}, \bar{\mu}_{max}]$, where $\bar{\mu}_{max}$; and it can be determined if there are smaller invariant sets inside I(1) by verifying the invariance conditions for $\mu \in [\mu_{min}, 1]$, for $\mu_{min} \in (0, 1)$. Then, a bisection method can be used to approximate the exact $\mu$-interval over which the invariant conditions are satisfied as accurately as desired.

One particular set of barrier functions used by the barrier function processor 308 for the octorotor 400 will now be described (e.g., a set of barrier functions for the octorotor system). As described herein, to approximate linear dynamics, the linearization around s=0 is used. This approximation decomposes into four subsystems in one implementation. The first subsystem consists of only the vertical velocity $v_z$. The nonlinear equation governing $v_z$, without disturbances, is:

$$\dot{v}_z = g - \frac{F}{m} c_\phi c_\theta,$$

which, when combined with the controller 502 described herein, yields:

$$\dot{v}_z = -\frac{K_{dx} c_\phi c_\theta}{m}(v_z - v_{z,d}).$$

It should be noted that it is assumed that $u=u_d$. Hence, the linearized system for $v_z$ is:

$$\dot{v}_z = -\frac{K_{dz}}{m}(v_z - v_{z,d}).$$

The system attempts to ensure that $|v_z - v_{z,d}| \leq D_{v_z}$ for some constant $D_{v_z} > 0$, assuming the bound $|v_{z,d}| \leq D_{v_{z,d}}$ with $D_{v_{z,d}} > 0$. As such, the barrier function components for $v_z$ are defined by:

$$h^\pm_{v_z,\mu}(s, v_{z,d}) = \pm \frac{v_z - v_{z,d}}{D_{v_z}} + \mu,$$

wherein one barrier function corresponds to "+" and one barrier function corresponds to "−". Thus, barrier functions of higher depth are not used to enforce $|v_z - v_{z,d}| \leq D_{vz}$.

The next subsystem consists of the roll angle and rate $(\varphi, \Omega_1)$. The nonlinear equations governing these variables, without disturbances, are:

$$\dot{\phi} = \Omega_1 + t_\theta(s_\phi \Omega_2 + c_\phi \Omega_3), \dot{\Omega}_1 = \frac{\tau_1 + \Omega_2 \Omega_3 (J_2 - J_3)}{J_1}.$$

Linearizing and combining with the controller 502 yields:

$$\dot{\phi} = \Omega_1, \dot{\Omega}_1 = \frac{-K_{p\phi}(\phi - \phi_d) - K_{d\phi}\Omega_1}{J_1}.$$

The system also attempts to ensure that $|\phi - \phi_d| \leq D_\phi$ for some $D_\phi > 0$, assuming that $|\phi_d| \leq D_{\phi_d}, D_{\Theta_d} > 0$, enforces the first inequality with barrier function sequences of depth 1. So for constants $p_{\varphi,1}, \delta_{\varphi,1} \geq 0$ with $\delta_{\varphi,1} < D_\varphi$, the barrier function components for $(\phi, \Omega_1)$ are defined as the following:

$$h^\pm_{\phi,0,\mu}(s, \phi_d) = \pm \frac{\phi - \phi_d}{D_\phi} + \mu,$$

$$h^\pm_{\phi,1,\mu}(s, \phi_d) = \pm \frac{\phi - \phi_d + p_{\phi,1}\Omega_1}{D_\phi - \delta_{\phi,1}} + \mu.$$

There are two remaining subsystems, one of which consists of the pitch angle and rate $(\theta\Omega_2)$, and the other consists of the yaw angle and rate $(\psi, \Omega_3)$. Both subsystems are very similar to that of the roll angle and rate. The nonlinear equations governing the dynamics of these variables are:

$$\dot{\theta} = c_\phi \Omega_2 - s_\phi \Omega_3, \dot{\psi} = \frac{s_\phi \Omega_2 + c_\phi \Omega_3}{c_\theta}$$

$$\dot{\Omega}_2 = \frac{\tau_2 + \Omega_1 \Omega_3(J_3 - J_1)}{J_2}, \dot{\Omega}_3 = \frac{\tau_3 + \Omega_1 \Omega_2(J_1 - J_2)}{J_3}.$$

Linearizing and then combining these equations with the controller 502 yields:

$$\dot{\theta} = \Omega_2, \dot{\Omega}_2 = \frac{-K_{p\theta}(\theta - \theta_d) - K_{d\theta}\Omega_2}{J_2}$$

$$\dot{\psi} = \Omega_3, \dot{\Omega}_3 = \frac{-K_{p\psi}(\psi - \psi_d) - K_{d\psi}\Omega_3}{J_3}.$$

For these variables, the system attempts to ensure that $|\theta - \theta_d| \leq D_\theta$ and $|\psi - \psi_d| \leq D_\psi$ for some $D_\theta, D_\psi > 0$, assuming that $|\theta_d| \leq D_{\theta_d}$ and $|\psi_d| \leq D_{\psi_d}, D_{\theta_d}, D_{104\ d} > 0$. As with the roll angle and rate, barrier function sequences of depth 1 are utilized. So, for constants $p_{\theta,1}, \delta_{\theta,1}, p_{\psi,1}, \delta_{\psi,1} \geq 0$ with $\delta_{\theta,1} < D_\theta$ and $\delta_{\psi,1} < D_\psi$, the barrier function components for $(\theta, \Omega_2)$ and $(\psi, \Omega_3)$ are defined as the following:

$$h^\pm_{\theta,0,\mu}(s, \theta_d) = \pm \frac{\theta - \theta_d}{D_\theta} + \mu,$$

$$h^\pm_{\theta,1,\mu}(s, \theta_d) = \pm \frac{\theta - \theta_d + p_{\theta,1}\Omega_2}{D_\theta - \delta_{\theta,1}} + \mu$$

$$h^\pm_{\psi,0,\mu}(s, \psi_d) = \pm \frac{\psi - \psi_d}{D_\psi} + \mu,$$

$$h^\pm_{\psi,1,\mu}(s, \psi_d) = \pm \frac{\psi - \psi_d + p_{\psi,1}\Omega_3}{D_\psi - \delta_{\psi,1}} + \mu.$$

Additionally, the following functions are included to ensure bounds of the form $|\Omega_1| \leq D_{\Omega_1}, |\Omega_2| \leq D_{\Omega_2}$, and $|\Omega_3| \leq D_{\Omega_3}$, where $D_{\Omega_1}, D_{\Omega_2}, D_{\Omega_3} > 0$:

$$h^\pm_{\Omega_1,\mu}(s) = \pm \frac{\Omega_1}{D_{\Omega_1}} + \mu,$$

$$h^\pm_{\Omega_2,\mu}(s) = \pm \frac{\Omega_2}{D_{\Omega_2}} + \mu,$$

$$h^\pm_{\Omega_3,\mu}(s) = \pm \frac{\Omega_3}{D_{\Omega_3}} + \mu.$$

In one example, the verification processor 310 implements an SMT solver (e.g., dReal) that analyze statements relating to the octorotor system defined as described herein. The SMT solver in some examples is capable of analyzing statements in first-order real arithmetic with non-linear function symbols (including, crucially, transcendental functions) in order to determine the satisfiability thereof. In order to overcome decidability issues, in one example, the SMT solver incorporates a numerical precision constant that mediates the granularity of the proof search. Specifically, given a statement φ, the SMT solver replies with one of the following:

1. An assignment of ranges (intervals) to the (free) variables of φ that makes the statement satisfiable modulo the numerical precision; or
2. A proof that there is no assignment that would make φ satisfiable.

That is, a determination is made by the verification analysis processor 302 (shown in FIG. 3) whether an unsatisfied (UNSAT) condition is confirmed at 312. If the UNSAT is satisfied then the verification is confirmed. If the UNSAT is not satisfied then the verification can be performed again with a modified flight controller design process 306. For example, one or more design parameters of the flight controller design process 306 are adjusted (e.g., a user adjusted input) and the herein described analysis performed again.

More particularly with respect to the confirmation process, the first case is referred to as a δ-SAT result. The second case is referred to as an UNSAT result. In general, it is not possible to determine, given the assignment corresponding to a δ-SAT result whether or not there are values in the range of the assignment that would make the statement satisfiable. However, sampling from these intervals can be performed and the results evaluated in order to further search for a genuinely satisfiable (SAT) result. In some examples, when running the SMT solver, a naïve search is performed within δ-SAT ranges by polling the midpoint of the returned box. Thus, the sequel SAT means a genuine counter-example has been identified via this further polling of the variable ranges returned as part of one of SMT solver's δ-SATs. It should be noted that safety properties are formulated in an attempt to obtain an UNSAT result, i.e., a proof of unsatisfiability, from the SMT solver.

In operation, a constant ϵ, a small positive number used for various operations, one of which is to make the safety conditions slightly more strict to account for potential numerical errors. Next, a search space is defined over which the formulated statements are proven. In particular, all of the following variables are restricted to a symmetric interval about 0:

$$v_z, \phi, \theta, \psi, \Omega_1, \Omega_2, \Omega_3, \Delta_z, \Delta_{R,1}, \Delta_{R,2}, \Delta_{R,3}, v_{z,d}, \phi_d, \theta_d, \psi_d.$$

That is, for all variables ξ described above ξ is restricted to lie in the interval $(-\xi_{max}, \xi_{max})$, where $\xi_{max} > 0$. The variable μ is also restricted to the interval $(1-\epsilon, \mu_{max}+\epsilon)$. This ensures that the SMT solver conducts a well bounded search, which avoids unnecessary computational issues. As described above, all conditions are expressed in terms of a search for a state which violates the desired safety condition. Thus, the SMT solver is used to verify that such a violation cannot exist, which proves the condition.

In some examples, barrier function support is provided inside the search space. In particular, the verification analysis processor 302 is configured to attempt to ensure that the common support of the barrier functions that are defined by the barrier function processor 308 is a subset of the search space. This is because it is necessary to search over the full boundary of the support when checking invariance. For this property, an SMT solver search is performed for a state s near the boundary of the search space, i.e., satisfying $\xi > \xi_{max} - \epsilon$ or $\xi < -\xi_{max} + \epsilon$ for some $\xi \in \{v_z, \phi, \theta, \psi, \Omega_1, \Omega_2, \Omega_3\}$, such that there exists a barrier function component h and, if needed, associated command c such that s is in or near the support of $h(\cdot, c)$, i.e., $h(s, c) > -\epsilon$. If h has no argument for a command c, then the last inequality is replaced by $h(s) > -\epsilon$. If the SMT solver verifies that no such state s exists, then it is concluded that the full support is inside the search space.

In some examples, invariance of barrier function support is provided. In particular, the verification analysis processor 302 is configured to check that barrier function support is invariant by checking the invariance property for each barrier function component. It is assumed that the controller 502 always works, i.e., $u = u_d$ and the rotor thrust limits are disregarded. Also, it is assumed that the states s over which the search is performed are in or near the support of every barrier function component, i.e., for all barrier function components h, $h(s, c) > -\epsilon$ for some associated command c, if such a command is needed, or otherwise $h(s) > -\epsilon$. With these assumptions, one condition is formulated for each barrier function component. For the component $h_*$, a search is performed for a state s and, if needed, a command c associated with $h_*$ such that s is on or near the boundary of the support of $h_*(\cdot, c)$ (or $h_*(s)$), i.e., $-\epsilon < h_*(s, c) < \epsilon$ (or $-\epsilon < h_*(x) < \epsilon$), and the time derivative of $h_*(s, c)$ (or $h_*(s)$) is almost negative, i.e., $d/dt (h_*(s, c)) < \epsilon$ (or $d/dt(h_*(s)) < \epsilon$). It should be recognized that the condition imposed on the state s to consider this state a violation of the invariance condition for $h_*$ is the following:

$$\begin{pmatrix} \text{for every } b.f. \text{ component } h, \text{ there exists and} \\ \text{associated command } c \text{ such that } h(s, c) > -\epsilon \end{pmatrix}$$

$$\wedge \begin{pmatrix} \text{there exists a command } c \text{ associated to } h_* \\ \text{such that } h_*(s, c) < \epsilon \text{ and } \frac{d}{dt}(h_*(s, c)) < \epsilon \end{pmatrix}.$$

For h or $h_*$ that has no argument for a command in the above expression, the corresponding command c is disregarded and replaced by $h(s, c)$ with $h(s)$, or $h_*(s, c)$ with $h_*(s)$. If, for every barrier function component $h_*$, there is no state s that satisfies the above condition, then the barrier function support is invariant under the controller 502.

In various examples, the rotor thrust bounds are checked. In particular, the equality $u = u_d$ was assumed in the previous condition. More specifically, a determination is made whether this equality is true over the support of the given barrier function and under the rotor failure combination being considered. As described in more detail herein, this determination can be performed by checking whether the thrusts $\tilde{f}_j$ of the non-failed rotors given by the allocation method are valid and stay within the interval $[f_{min}, f_{max}]$, that is, as long as rank(Λw)=4. A condition for each combination of rotor failures is defined as $W \subseteq \{1, \ldots, 8\}$ such that rank(Λw)=4. It should be appreciated that $u_d$ can be considered a function of s by definition, and as a result, $\tilde{f}_{all}$ can be considered as a function of s. As such a search can be performed for a state s such that for every barrier function component h, $h(s, c) > -\epsilon$ for a corresponding command c (or $h(s) > -\epsilon$), and additionally, for $j \in W$, wherein $\tilde{f}_j$ is outside, or nearly outside, of $[f_{min}, f_{max}]$, i.e., $\tilde{f}_j - f_{max} > -\epsilon$ or $\tilde{f}_j - f_{min} < \epsilon$. If the SMT solver verifies that no such state s exists, then the controller 502 behaves as intended for the rotor failure combination being analyzed.

An example of an octorotor safety verification that was performed according to the present disclosure will now be described. In this example, the verification process performed by the verification analysis processor 302 is applied to an octorotor model. For example, the octorotor model has mass m=1.2 kg, inertia matrix entries $J_1=J_2=7.5\times10^{-3}$ kg·m$^2$ and $J_3=1.3\times10^{-2}$ kg·m$^2$, arm length d=0.4 m, and torque-to-thrust ratio $c=(7.5/3.13)\times10^{-2}$ m. Additionally, the minimum and maximum rotor thrusts are set to be $f_{min}=0$ and $f_{max}=1$ mg, and the maximum disturbance magnitudes set to be $\Delta_{r,max}=1/10$ mg, $\Delta_{R,12,max}=(0.6 \text{ rad/s}^2)J_1$, and $\Delta_{R,3,max}=(0.6 \text{ rad/s}^2)J_3$.

Next, to determine the coefficients of the controller 502, the linear quadratic regulator for the linearization of the octorotor system at s=0 is computed, while assuming that $s_d=0$ and neglecting the disturbances $\Delta_r$, $\Delta_R$. Specifically, a determination is made to the linear controller that minimizes the objective function $$\int_0^\infty (s^T Q s + |\mu|^2)dt,$$

with $Q = \text{diag}\left(40, \frac{1}{4}, \frac{1}{4}, \frac{1}{4}, \frac{1}{8}, \frac{1}{8}, \frac{1}{8}\right)$, under the linearized dynamics.

The resulting coefficients in are then (approximately) as follows:

$K_{dz}=6.32$, $K_{p\phi}=K_{p\theta}=K_{p\psi}=0.5$ $K_{d\phi}=K_{d\theta}=0.364$, $K_{d\psi}=0.371$.

Next, to define the barrier function components, the following assignments are made:

$D_{v_z}=0.25$, $D_{v_{z,d}}=1$, $D_\phi=D_\theta=D_\psi=0.05$, $D_{\phi_d}=D_{\theta_d}=0.15$, $D_{\psi_d}=\epsilon$, $D_{\Omega_1}=D_{\Omega_2}=D_{\Omega_3}=0.09$, $p_{\phi,1}=p_{\theta,1}=p_{\psi,1}=0.7$, $\delta_{\phi,1}=\delta_{\theta,1}=\delta_{\psi,1}=0.017$, $\mu_{max}=2$.

This means that the command $v_{z,d}$ is allowed to span the interval (−1, 1), and $\phi_d$ and $\theta_d$ are allowed to span (−0.15, 0.15). It should be noted that there is no loss in letting $D_{\psi_d}=\epsilon$, hence $\psi_d\approx0$, since coordinates can be redefined so that $\psi_d=0$. Also, for any combination of commands, the candidate invariant set resulting from the barrier functions is the set I(1) of states s such that $|v_z-v_{z,d}|\leq0.25$, $(\phi,\Omega_1)\in S_{\phi_d}$, $(\theta,\Omega_2)\in S_{\theta_d}$, and $(\psi,\Omega_3)\in S_{\psi_d}$, where $$S_{\alpha_d} = \left\{(\alpha, \omega)\in\mathbb{R}^2: \begin{array}{l}|\alpha-\alpha_d|\leq 0.05, |\omega|\leq 0.09 \\ |\alpha-\alpha_d+0.7\omega|\leq 0.033\end{array}\right\}.$$

Figure 6:
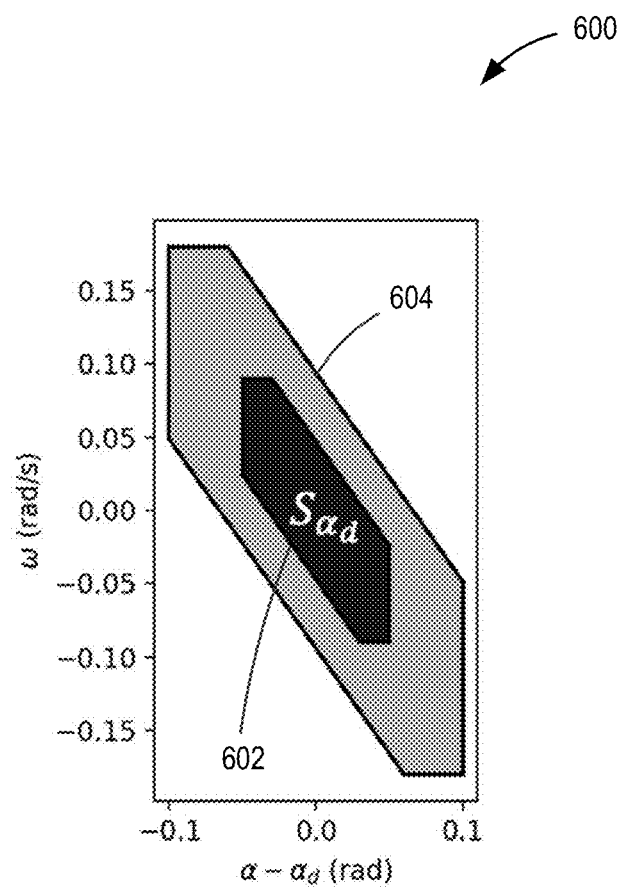
FIG. 6 is a graph illustrating barrier function data sets according to an example.

As illustrated in the graph 600 of FIG. 6, the set $S_{\alpha_d}$ is the region 602. The region 604 is the dilation of $S_{\alpha_d}$ by a factor of two, and corresponds to the region of attraction for the invariant set. It should be noted that $\epsilon=10^{-8}$.

With all of the above definitions, the SMT solver was used to obtain a proof of safety in the case of no rotor failures, as well as combinations of rotor failures. That is, the SMT solver verified that the set I(μ) is invariant for $1\leq\mu\leq2$ under the controller 502 with the coefficients described herein, and that the octorotor 400 is capable of executing the controller's actions under various rotor failure combinations. As can be seen in Table 1, it was shown that the octorotor 400 remains safe for up to two rotor failures, except when the failures occur on adjacent rotors that rotate the same direction.

TABLE 1

| Step: Rotor bounds under failures | Precision | SAT/ UNSAT | Proof times (with 16 cores) | | |
|---|---|---|---|---|---|
| | | | real | user | sys |
| Rotor 1 complete failure | $10^{-2}$ | UNSAT | 0 m 0.925 s | 0 m 5.847 s | 0 m 4.571 s |
| Rotor 1, 2 complete failures | $10^{-5}$ | SAT | 0 m 0.818 s | 0 m 4.810 s | 0 m 4.687 s |
| Rotor 1, 3 complete failures | $10^{-2}$ | UNSAT | 0 m 0.923 s | 0 m 5.823 s | 0 m 4.594 s |
| Rotor 1, 4 complete failures | $10^{-2}$ | UNSAT | 0 m 0.910 s | 0 m 5.870 s | 0 m 4.416 s |
| Rotor 1, 5 complete failures | $10^{-2}$ | UNSAT | 0 m 0.803 s | 0 m 4.179 s | 0 m 3.971 s |
| Rotor 1, 6 complete failures | $10^{-2}$ | UNSAT | 0 m 0.898 s | 0 m 5.660 s | 0 m 4.343 s |
| Rotor 1, 7 complete failures | $10^{-2}$ | UNSAT | 0 m 0.893 s | 0 m 5.723 s | 0 m 4.313 s |
| Rotor 1, 8 complete failures | $10^{-2}$ | UNSAT | 0 m 1.035 s | 0 m 6.969 s | 0 m 4.322 s |

Thus, various examples provide a framework for the verification of the safety of control systems using exponential barrier functions, with the target application of ensuring the guaranteed command tracking of, for example, an octorotor controller as illustrated herein. Barrier functions are used in examples to construct candidate invariant sets for the octorotor dynamics, and invariance of these sets are then checked by the SMT solver in some examples. Potential rotor failures are accounted for through a pseudo-inverse control allocator (such as the control allocator 506 shown in FIG. 5), which was also verified to produce valid rotor thrusts via the SMT solver. As described herein, the examples verify that a particular controller causes the octorotor 400 to follow commands within a certain margin of error under dynamic disturbances and several types of rotor failures. As should be appreciated and noted herein, the present disclosure is implementable to construct safe invariant sets in many different systems and using different kinds of controllers (e.g., gain scheduled controllers for aircraft).

Figure 7:
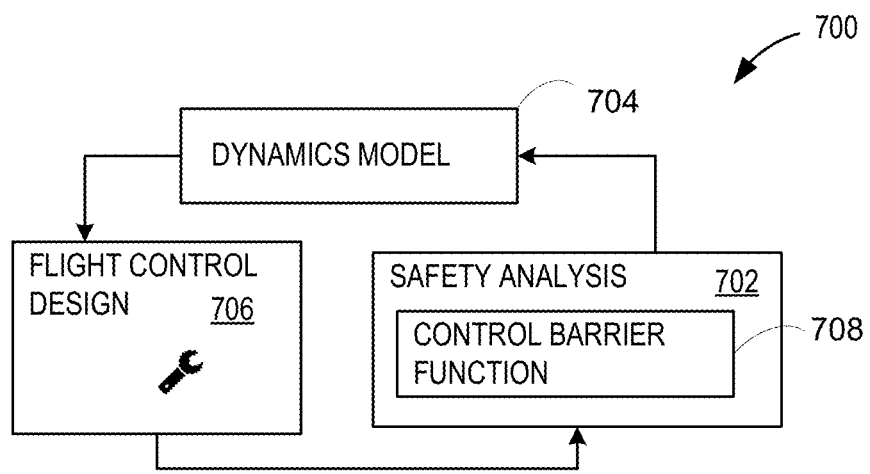
FIG. 7 illustrates an operational loop for performing safety analysis according to an example.

FIG. 7 illustrates an operational loop 700 performing safety analysis 702 for a flight control design 706 using one or more dynamics models 704. In the operational loop, the safety analysis 702 is performed based on received data from the flight control design 706 (e.g., design control parameters), which are used to generate the one or more dynamics models 704. With the one or more dynamics models 704, the safety analysis 702 is performed using one or more control barrier functions 708. For example, as described in more detail herein, the safety analysis 702 is an analysis for a multirotor aerial vehicle in different scenarios with component failures, such as rotor failures. The safety analysis 702 in various examples obtains assurances that a flight remains safe in spite of realistic failures, identifies failure scenarios where a flight may not be safe, and/or allows for making potential revisions to the system in response thereto (e.g., modifying the flight control design 706).

As described herein, the one or more dynamics models 704 in some examples are models for the vehicle dynamics during failure scenarios of interest, and includes a control allocator that accounts for failures. With the herein described framework, candidate safe invariant sets are generated for the vehicle, including sets of safe states, i.e., sufficiently close to the commanded state, and potential sets that the vehicle state will not exit. For each failure scenario of interest, and for a candidate invariant set, some examples use SMT solving to prove that the candidate invariant set is invariant. With the various examples, barrier functions can be used in a manner that is decoupled from the design of the control algorithms as described herein, and thus can be applied to controllers defined outside of the design framework.

In some examples, the safety analysis is performed using a plurality of processes, such as performed by the barrier function processor 308 and the verification processor 310 (both shown in FIG. 3). In some examples, the barrier function processor 308 constructs the control barrier functions 708 that results in candidate invariant sets for the vehicle's dynamics (e.g., octorotor's dynamics). The verification processor 310 analyzes the flight control (based on the flight control design 706) against the candidate barrier functions, namely candidate control barrier functions 708.

In various examples, the operational loop relies on one or more assumptions, including:

A command tracking controller for the vehicle is in place which causes the system state to track a fixed commanded state;

The closed loop dynamics of the vehicle can be approximated well by the linearization around the commanded state, or a nearby state of interest; and/or The desired conditions to be enforced on the invariant set are given by a set of linear inequalities on the state space of the system. These inequalities are used to form a starting set of states near the commanded state within which to find a set that is forward invariant. These inequalities quantify the desired accuracy with which the actual state is able to remain close to the commanded state.

Figure 8:
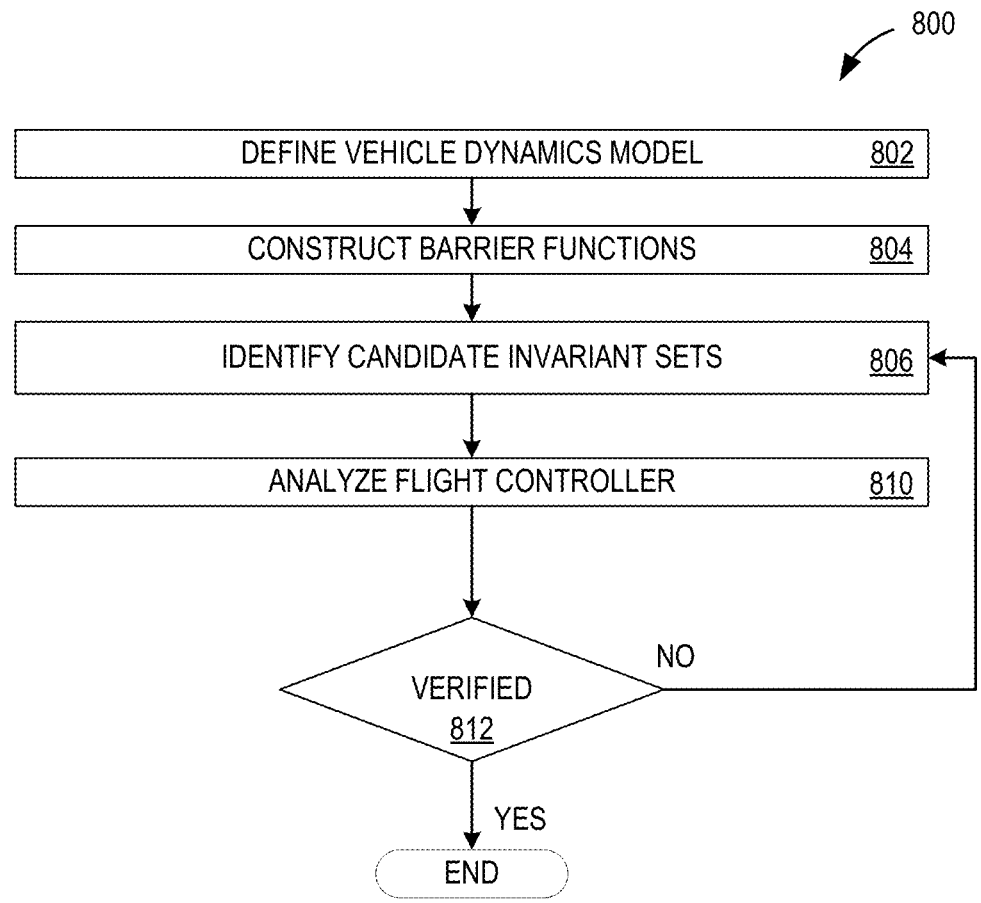
FIG. 8 is a flow chart illustrating a method of evaluating the safety of vehicle control according to an example.

With reference now to FIG. 8, a flow chart 800 illustrates a method for evaluating the safety of vehicle controls, such as a multirotor air vehicle controls, as may be used with the examples described herein, for example during production, component and subassembly manufacturing 1006 of FIG. 10. In one example, the operations illustrated in FIG. 8 are performed, at least in part, by executing instructions 902*a* (stored in the memory 902) by the one or more processors 904 of the computing device 900 of FIG. 9. Operation 802 includes defining a vehicle dynamics model. For example, as described herein, a non-linear octorotor model is developed (e.g., use simulation and analysis software to develop the model).

Operation 804 includes constructing one or more barrier functions. For example, as described herein, one or more barrier functions are constructed based on the vehicle dynamics model. Operation 806 includes identifying candidate invariant sets. For example, candidate invariant sets for the vehicle dynamics model (dynamical system) are yielded from the one or more barrier functions. Operation 810 includes analyzing the flight controller against the candidate invariant sets. In one example, after the candidate invariant sets are produced via the one or more barrier functions, analysis is performed inside the invariant set to confirm that the vehicle's rotors are capable of performing the actions demanded by the PD controller component, and in particular whether the rotor thrusts outputted by the control allocation component of the controller can be produced by the rotors. For example, an SMT solver is used in some examples. The SMT solver is used to format and check the statement that at some state in the invariant set, there is a rotor thrust outputted by the control allocator that, with modulo numerical precision, falls outside the set of thrusts the rotor is capable of exerting. That is, operation 812 determines whether the safety is verified. For example, obtaining a negative result for this statement then proves that at all states in the invariant set, the control allocator always produces thrusts that the rotors are capable of exerting. It should be noted that the control allocator accounts for the specific rotor failures that occur, and as such, the verification operation at 812 is performed for each rotor failure scenario that is of interest.

Figure 9:
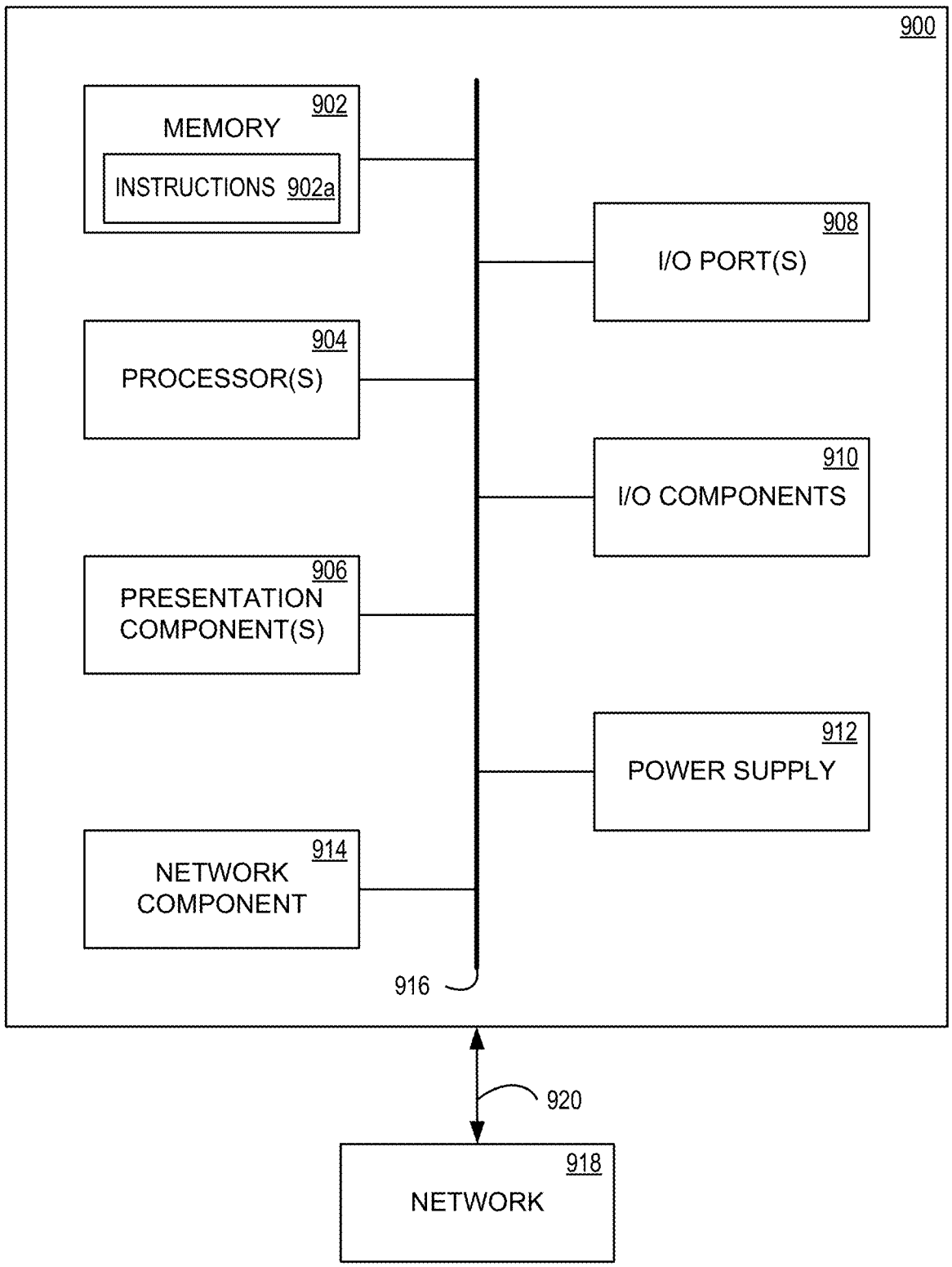
FIG. 9 is a block diagram of a computing device suitable for implementing various aspects of the disclosure.

With reference now to FIG. 9, a block diagram of the computing device 900 suitable for implementing various aspects of the disclosure is described. In some examples, the computing device 900 includes one or more processors 904, one or more presentation components 906 and the memory 902. The disclosed examples associated with the computing device 900 are practiced by a variety of computing devices, including personal computers, laptops, smart phones, mobile tablets, hand-held devices, consumer electronics, specialty computing devices, etc. Distinction is not made between such categories as "workstation," "server," "laptop," "hand-held device," etc., as all are contemplated within the scope of FIG. 9 and the references herein to a "computing device."

The disclosed examples are also practiced in distributed computing environments, where tasks are performed by remote-processing devices that are linked through a communications network. Further, while the computing device 900 is depicted as a seemingly single device, in one example, multiple computing devices work together and share the depicted device resources. For instance, in one example, the memory 902 is distributed across multiple devices, the processor(s) 904 provided are housed on different devices, and so on.

In one example, the memory 902 includes any of the computer-readable media discussed herein. In one example, the memory 902 is used to store and access instructions 902*a* configured to carry out the various operations disclosed herein. In some examples, the memory 902 includes computer storage media in the form of volatile and/or nonvolatile memory, removable or non-removable memory, data disks in virtual environments, or a combination thereof. In one example, the processor(s) 904 includes any quantity of processing units that read data from various entities, such as the memory 902 or input/output (I/O) components 910. Specifically, the processor(s) 904 are programmed to execute computer-executable instructions for implementing aspects of the disclosure. In one example, the instructions are performed by the processor, by multiple processors within the computing device 900, or by a processor external to the computing device 900. In some examples, the processor(s) 904 are programmed to execute instructions such as those illustrated in the flow charts discussed below and depicted in the accompanying drawings.

The presentation component(s) 906 present data indications to an operator or to another device. In one example, presentation components 906 include a display device, speaker, printing component, vibrating component, etc. One skilled in the art will understand and appreciate that computer data is presented in a number of ways, such as visually in a graphical user interface (GUI), audibly through speakers, wirelessly between the computing device 900, across a wired connection, or in other ways.

In one example, presentation component(s) 906 are not used when processes and operations are sufficiently automated that a need for human interaction is lessened or not needed. I/O ports 908 allow the computing device 900 to be logically coupled to other devices including the I/O components 910, some of which is built in. Examples of the I/O components 910 include, for example but without limitation, a microphone, keyboard, mouse, joystick, game pad, satellite dish, scanner, printer, wireless device, etc.

The computing device 900 includes a bus 916 that directly or indirectly couples the following devices: the memory 902, the one or more processors 904, the one or more presentation components 906, the input/output (I/O) ports 908, the I/O components 910, a power supply 912, and a network component 914. The computing device 900 should not be interpreted as having any dependency or requirement related to any single component or combination of components illustrated therein. The bus 916 represents one or more busses (such as an address bus, data bus, or a combination thereof). Although the various blocks of FIG. 9 are shown with lines for the sake of clarity, some examples blur functionality over various different components described herein.

In some examples, the computing device 900 is communicatively coupled to a network 918 using the network component 914. In some examples, the network component 914 includes a network interface card and/or computer-executable instructions (e.g., a driver) for operating the network interface card. In one example, communication between the computing device 900 and other devices occur using any protocol or mechanism over a wired or wireless connection 920. In some examples, the network component 914 is operable to communicate data over public, private, or hybrid (public and private) using a transfer protocol, between devices wirelessly using short range communication technologies (e.g., near-field communication (NFC), Bluetooth® branded communications, or the like), or a combination thereof.

Although described in connection with the computing device 900, examples of the disclosure are capable of implementation with numerous other general-purpose or special-purpose computing system environments, configurations, or devices. Implementations of well-known computing systems, environments, and/or configurations that are suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network personal computers (PCs), minicomputers, mainframe computers, distributed computing environments that include any of the above systems or devices, virtual reality (VR) devices, holographic device, and the like. Such systems or devices accept input from the user in any way, including from input devices such as a keyboard or pointing device, via gesture input, proximity input (such as by hovering), and/or via voice input.

Implementations of the disclosure are described in the general context of computer-executable instructions, such as program modules, executed by one or more computers or other devices in software, firmware, hardware, or a combination thereof. In one example, the computer-executable instructions are organized into one or more computer-executable components or modules. Generally, program modules include, but are not limited to, routines, programs, objects, components, and data structures that perform particular tasks or implement particular abstract data types. In one example, aspects of the disclosure are implemented with any number and organization of such components or modules. For example, aspects of the disclosure are not limited to the specific computer-executable instructions or the specific components or modules illustrated in the figures and described herein. Other implementations of the disclosure include different computer-executable instructions or components having more or less functionality than illustrated and described herein. In implementations involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. In one example, computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium used to store information for access by a computing device. In contrast, communication media typically embody computer readable instructions, data structures, program modules, or the like in a modulated data signal such as a carrier wave or other transport mechanism and include any information delivery media.

Figure 11:
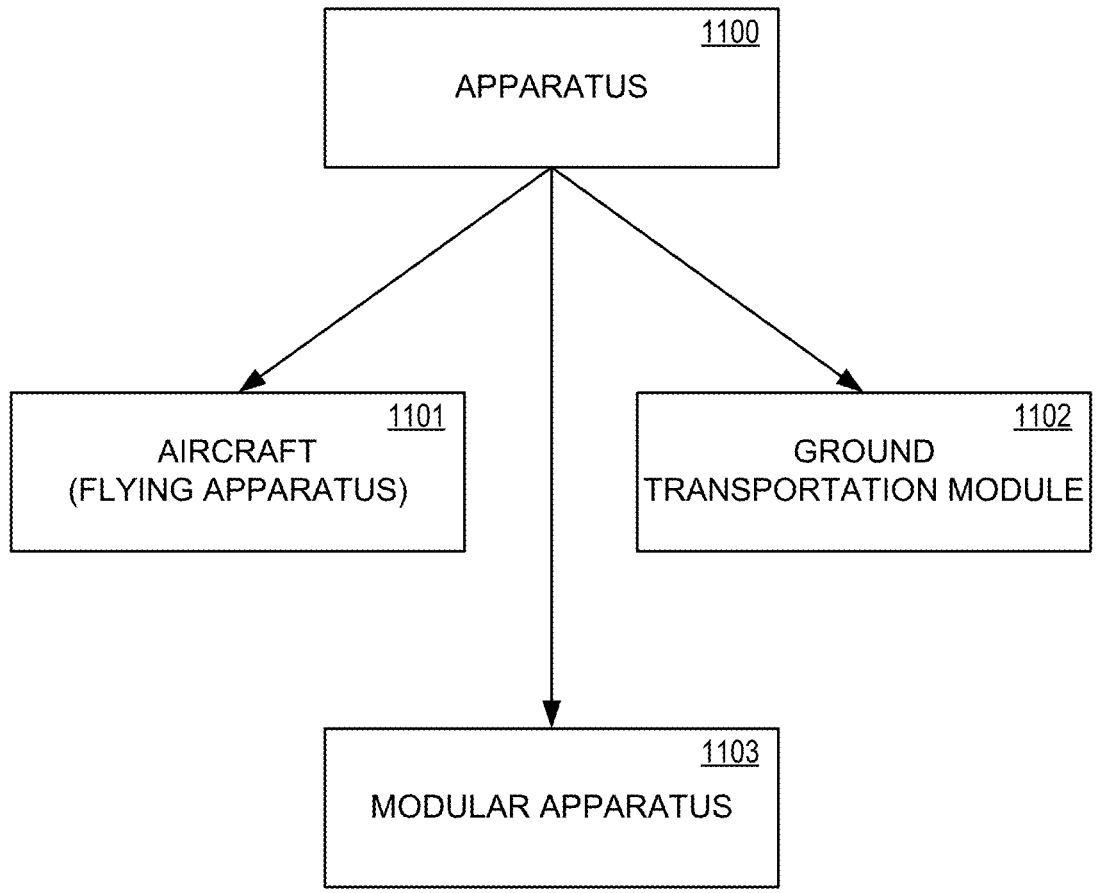
FIG. 11 is a block diagram of an apparatus for which various aspects of the disclosure may be advantageously employed.

Some examples of the disclosure are used in manufacturing and service applications as shown and described in relation to FIGS. 10 and 11. Thus, implementations of the disclosure are described in the context of an apparatus of manufacturing and service method 1000 shown in FIG. 10 and apparatus 1100 shown in FIG. 11. In FIG. 10, a diagram illustrating an apparatus manufacturing and service method 1000 is depicted in accordance with an example. In one example, during pre-production, the apparatus manufacturing and service method 1000 includes specification and design 1002 of the apparatus 1100 in FIG. 11 and material procurement 1004. During production, component and subassembly manufacturing 1006 and system integration 1008 of the apparatus 1100 in FIG. 11 takes place. Thereafter, the apparatus 1100 in FIG. 11 goes through certification and delivery 1010 in order to be placed in service 1012. While in service by a customer, the apparatus 1100 in FIG. 11 is scheduled for routine maintenance and service 1014, which, in one example, includes modification, reconfiguration, refurbishment, and other maintenance or service subject to configuration management, described herein.

In one example, each of the processes of the apparatus manufacturing and service method 1000 are performed or carried out by a system integrator, a third party, and/or an operator. In these examples, the operator is a customer. For the purposes of this description, a system integrator includes any number of apparatus manufacturers and major-system subcontractors; a third party includes any number of venders, subcontractors, and suppliers; and in one example, an operator is an owner of an apparatus or fleet of the apparatus, an administrator responsible for the apparatus or fleet of the apparatus, a user operating the apparatus, a leasing company, a military entity, a service organization, or the like.

With reference now to FIG. 11, the apparatus 1100 is provided. As shown in FIG. 11, an example of the apparatus 1100 is a flying apparatus 1101, such as an aerospace vehicle, aircraft, UAV, air cargo, flying car, earth-orbiting satellite, planetary probe, deep space probe, solar probe, and the like. As also shown in FIG. 11, a further example of the apparatus 1100 is a ground transportation module 1102, such as an automobile, a truck, heavy equipment, construction equipment, a boat, a ship, a submarine and the like. A further example of the apparatus 1100 shown in FIG. 11 is a modular apparatus 1103 that comprises at least one or more of the following modules: an air module, a payload module and a ground module. The air module provides air lift or flying capability. The payload module provides capability of transporting objects such as cargo or live objects (people, animals, etc.). The ground module provides the capability of ground mobility. The disclosed solution herein is applied to each of the modules separately or in groups such as air and payload modules, or payload and ground, etc. or all modules.

The examples disclosed herein are described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples are practiced in a variety of system configurations, including personal computers, laptops, smart phones, mobile tablets, hand-held devices, consumer electronics, specialty computing devices, etc. The disclosed examples are also practiced in distributed computing environments, where tasks are performed by remote-processing devices that are linked through a communications network.

The following clauses describe further aspects of the present disclosure. In some implementations, the clauses described below can be further combined in any subcombination without departing from the scope of the present disclosure.

When introducing elements of aspects and implementations of the disclosure or the examples thereof, the articles "a," "an," "the," and "said" are intended to mean that there are one or more of the elements. In other words, the indefinite articles "a", "an", "the", and "said" as used in the specification and in the claims, unless clearly indicated to the contrary, should be understood to mean "at least one."

The phrase "one or more of the following: A, B, and C" means "at least one of A and/or at least one of B and/or at least one of C." The phrase "and/or", as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one implementation, to A only (optionally including elements other than B); in another implementation, to B only (optionally including elements other than A); in yet another implementation, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of" or, when used in the claims, "consisting of" will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of" or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one implementation, to at least one, optionally including more than one, A, with no B present (and optionally including elements other than B); in another implementation, to at least one, optionally including more than one, B, with no A present (and optionally including elements other than A); in yet another implementation, to at least one, optionally including more than one, A, and at least one, optionally including more than one, B (and optionally including other elements); etc.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

It is to be understood that the above description is intended to be illustrative, and not restrictive. For example, the above-described implementations (and/or aspects thereof) can be used in combination with each other. In addition, many modifications can be made to adapt a particular situation or material to the teachings of the various implementations of the disclosure without departing from their scope. While the dimensions and types of materials described herein are intended to define the parameters of the various implementations of the disclosure, the implementations are by no means limiting and are example implementations. Many other implementations will be apparent to those of ordinary skill in the art upon reviewing the above description. The scope of the various implementations of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various implementations of the disclosure, including the best mode, and also to enable any person of ordinary skill in the art to practice the various implementations of the disclosure, including making and using any devices or systems and performing any incorporated methods. The patentable scope of the various implementations of the disclosure is defined by the claims, and can include other examples that occur to those persons of ordinary skill in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A computerized method of evaluation of flight controls for an aerial vehicle, the computerized method comprising:
    defining a vehicle dynamics model corresponding to the aerial vehicle, wherein the vehicle dynamics model is to model rigid body dynamics and a characteristic of rotors of the aerial vehicle, wherein the aerial vehicle comprises a multirotor, wherein the vehicle dynamics model includes a model for dynamics during one or more failure scenarios;
    constructing one or more barrier functions based on the defined vehicle dynamics model;
    identifying candidate invariant sets for the defined vehicle dynamics model using the one or more barrier functions;
    confirming within the identified candidate invariant sets, command tracking of the aerial vehicle with first control commands, based on a plurality of flight controls by confirming that states of the candidate invariant sets are able to be implemented by the aerial vehicle;
    identifying second control commands that have states within the identified candidate invariant sets that cannot be implemented by the aerial vehicle; and
    using a controller to perform the command tracking of the multirotor, the controller comprising a control allocator configured to implement rotor failures for the multirotor.

2. The computerized method of claim 1, wherein the one or more barrier functions comprise exponential control barrier functions.

3. The computerized method of claim 1, wherein the multirotor is an octorotor.

4. The computerized method of claim 1, wherein analyzing the plurality of flight controls comprises performing a safety analysis of the plurality of flight controls during a design stage or a validation stage of the aerial vehicle.

5. The computerized method of claim 1, further comprising producing an invariant subset of a safe region with a defined range of a desired command point in a state space of a control system having the plurality of flight controls.

6. The computerized method of claim 5, further comprising automatically confirming the safe region is invariant using a satisfiability modulo theories (SMT) solver.

7. The computerized method of claim 5, further comprising determining a set of linear inequalities on the state space using the invariant subset, the set of linear inequalities forming a candidate invariant region in which the confirming is performed.

8. A system for evaluation of flight controls for an aerial vehicle, the system comprising:
    at least one processor; and
    at least one memory comprising computer program code, the at least one memory and the computer program code configured to, with the at least one processor, cause the at least one processor to:
    define a vehicle dynamics model corresponding to the aerial vehicle, wherein the vehicle dynamics model is to model rigid body dynamics and a characteristic of rotors of the aerial vehicle, wherein the aerial vehicle comprises a multirotor, wherein the vehicle dynamics model includes a model for dynamics during one or more failure scenarios;
    construct one or more barrier functions based on the defined vehicle dynamics model;
    identify candidate invariant sets for the defined vehicle dynamics model using the one or more barrier functions;
    confirm within the identified candidate invariant sets, command tracking of the aerial vehicle with first control commands based on a plurality of flight controls by confirming that states of the candidate invariant sets are able to be implemented by the aerial vehicle;
    identify second control commands that have states within the identified candidate invariant sets that cannot be implemented by the aerial vehicle; and
    using a controller to perform the command tracking of the multirotor, the controller comprising a control allocator configured to implement rotor failures for the multirotor.

9. The system of claim 8, wherein the one or more barrier functions comprise exponential control barrier functions.

10. The system of claim 8, wherein the multirotor is an octorotor.

11. The system of claim 8, wherein the computer program code is further configured to, with the at least one processor, cause the at least one processor to analyze the plurality of flight controls using a safety analysis of the plurality of flight controls during a design stage or a validation stage of the aerial vehicle.

12. The system of claim 8, wherein the computer program code is further configured to, with the at least one processor, cause the at least one processor to produce an invariant subset of a safe region with a defined range of a desired command point in a state space of a control system having the plurality of flight controls.

13. The system of claim 12, wherein the computer program code is further configured to, with the at least one processor, cause the at least one processor to automatically confirm the safe region is invariant using a satisfiability modulo theories (SMT) solver.

14. The system of claim 12, wherein the computer program code is further configured to, with the at least one processor, cause the at least one processor to determine a set of linear inequalities on the state space using the invariant subset, the set of linear inequalities forming a candidate invariant region in which the confirming is performed.

15. One or more computer storage media having computer-executable instructions for evaluation of flight controls for an aerial vehicle that, upon execution by a processor, cause the processor to at least:
define a vehicle dynamics model corresponding to the aerial vehicle, wherein the vehicle dynamics model is to model rigid body dynamics and a characteristic of rotors of the aerial vehicle, wherein the aerial vehicle comprises a multirotor, wherein the vehicle dynamics model includes a model for dynamics during one or more failure scenarios;
construct one or more barrier functions based on the defined vehicle dynamics model;
identify candidate invariant sets for the defined vehicle dynamics model using the one or more barrier functions;
confirm within the identified candidate invariant sets, command tracking of the aerial vehicle with first control commands based on a plurality of flight controls by confirming that states of the candidate invariant sets are able to be implemented by the aerial vehicle;
identify second control commands that have states within the identified candidate invariant sets that cannot be implemented by the aerial vehicle; and
using a controller to perform the command tracking of the multirotor, the controller comprising a control allocator configured to implement rotor failures for the multirotor.

16. The one or more computer storage media of claim 15, wherein the one or more barrier functions comprise exponential control barrier functions.

17. The one or more computer storage medial of claim 15, wherein the multirotor is an octorotor.

18. The one or more computer storage media of claim 15, having further computer-executable instructions that, upon execution by the processor, cause the processor to at least analyze the plurality of flight controls using a safety analysis of the plurality of flight controls during a design stage or a validation stage of the aerial vehicle.

19. The one or more computer storage media of claim 15, having further computer-executable instructions that, upon execution by the processor, cause the processor to at least to produce an invariant subset of a safe region with a defined range of a desired command point in a state space of a control system having the plurality of flight controls.

20. The one or more computer storage media of claim 19, having further computer-executable instructions that, upon execution by the processor, cause the processor to at least automatically confirm the safe region is invariant using a satisfiability modulo theories (SMT) solver and determine a set of linear inequalities on the state space using the invariant subset, the set of linear inequalities forming a candidate invariant region in which the confirming is performed.

* * * * *